(12) United States Patent
Sasaki et al.

(10) Patent No.: US 9,493,208 B2
(45) Date of Patent: Nov. 15, 2016

(54) VEHICLE

(71) Applicant: YAMAHA HATSUDOKI KABUSHIKI KAISHA, Iwata-shi, Shizuoka (JP)

(72) Inventors: Kaoru Sasaki, Shizuoka (JP); Yosuke Hirayama, Shizuoka (JP);
(Continued)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,382

(22) PCT Filed: Jun. 30, 2014

(86) PCT No.: PCT/JP2014/067486
§ 371 (c)(1),
(2) Date: Dec. 28, 2015

(87) PCT Pub. No.: WO2015/002173
PCT Pub. Date: Jan. 8, 2015

(65) Prior Publication Data
US 2016/0129967 A1 May 12, 2016

(30) Foreign Application Priority Data

Jul. 1, 2013 (JP) .................................. 2013-138488
Oct. 2, 2013 (JP) .................................. 2013-207729

(51) Int. Cl.
*B62K 25/04* (2006.01)
*B62K 5/08* (2006.01)
(Continued)

(52) U.S. Cl.
CPC .................. *B62K 25/04* (2013.01); *B62J 6/00* (2013.01); *B62J 6/005* (2013.01); *B62J 6/02* (2013.01);
(Continued)

(58) Field of Classification Search
CPC ........... B62K 25/04; B62K 5/027; B62K 5/05; B62K 5/10; B62K 5/08; B62J 6/00; B62J 6/02; B62J 6/005
See application file for complete search history.

(56) References Cited

U.S. PATENT DOCUMENTS 4,351,410 A * 9/1982 Townsend ................ B62D 9/02
180/210
6,250,649 B1 * 6/2001 Braun ................ B60G 17/0162
280/124.106
(Continued)

FOREIGN PATENT DOCUMENTS

CN 1654262 A 8/2005
CN 101487576 A 7/2009
(Continued)

OTHER PUBLICATIONS

Official Communication issued in International Application PCT/JP2014/067486, mailed on Sep. 22, 2014.
(Continued)

*Primary Examiner* — Drew Brown
(74) *Attorney, Agent, or Firm* — Keating and Bennett, LLP

(57) ABSTRACT

A vehicle prevents interference of a right lamp and a left lamp with a link mechanism without increasing the size of the vehicle in its width direction. A right link side portion of a right lamp is located on the right of a locus along which a link mechanism extends when an upper cross portion turns when looking at the vehicle from the front of an upper
(Continued)

middle axis. At least a portion of the right link side portion is located on the left of a right end portion of a body cover, above the upper middle axis, and below an upper end portion of the link mechanism that results when the upper cross portion turns clockwise to a maximum extent relative to a body frame, when looking at the vehicle from the front of the upper middle axis.

12 Claims, 13 Drawing Sheets

(72) Inventors: Kazuhisa Takano, Shizuoka (JP);
Toshio Iizuka, Shizuoka (JP);
Hirotoshi Noguchi, Shizuoka (JP)

(51) Int. Cl.
*B62J 6/00* (2006.01)
*B62K 5/10* (2013.01)
*B62J 6/02* (2006.01)
*B62K 5/027* (2013.01)
*B62K 5/05* (2013.01)

(52) U.S. Cl.
CPC ............... *B62K 5/027* (2013.01); *B62K 5/05* (2013.01); *B62K 5/08* (2013.01); *B62K 5/10* (2013.01)

(56) References Cited

U.S. PATENT DOCUMENTS

| | | | |
|---|---|---|---|
| 6,367,824 B1 * | 4/2002 | Hayashi | B62K 5/05 280/124.103 |
| D547,242 S | 7/2007 | Lambri | |
| 7,416,046 B2 | 8/2008 | Aube et al. | |
| 7,568,541 B2 | 8/2009 | Pfeil et al. | |
| 7,988,226 B2 | 8/2011 | Hirukawa | |
| 8,016,302 B1 * | 9/2011 | Reeve | B62K 5/05 280/124.103 |
| 8,123,240 B2 * | 2/2012 | Mercier | B62D 9/02 280/124.103 |
| 8,141,890 B2 * | 3/2012 | Hughes | B60G 21/007 180/210 |
| 8,262,111 B2 * | 9/2012 | Lucas | B60G 3/20 180/210 |
| 8,641,064 B2 * | 2/2014 | Krajekian | B62K 5/027 180/210 |
| 8,690,168 B2 * | 4/2014 | Yu | B62K 5/027 280/124.103 |
| 9,090,281 B2 * | 7/2015 | Spahl | B62D 9/02 |
| 9,145,168 B2 * | 9/2015 | Spahl | B62D 9/02 |
| 9,238,482 B2 * | 1/2016 | Huang | B62D 9/04 |
| 9,248,857 B2 * | 2/2016 | Spahl | B62D 9/02 |
| 9,283,989 B2 * | 3/2016 | Spahl | B62D 9/02 |
| 2005/0167174 A1 | 8/2005 | Marcacci | |
| 2008/0023242 A1 | 1/2008 | Lachapelle et al. | |
| 2008/0169134 A1 * | 7/2008 | Tomolillo | B60J 1/04 180/6.24 |
| 2008/0179486 A1 * | 7/2008 | Russell | G09F 21/04 248/479 |
| 2009/0057509 A1 * | 3/2009 | Hirukawa | B60Q 1/32 248/205.1 |
| 2009/0185388 A1 | 7/2009 | Kageyama | |
| 2013/0168944 A1 | 7/2013 | Bartolozzi et al. | |

FOREIGN PATENT DOCUMENTS

| | | |
|---|---|---|
| DE | 10 2010 052 716 A1 | 6/2011 |
| JP | 5-139357 A | 6/1993 |
| JP | 2005-313876 A | 11/2005 |
| JP | 2009-56950 A | 3/2009 |
| TW | 201117997 A1 | 6/2011 |
| WO | 2012/007819 A1 | 1/2012 |

OTHER PUBLICATIONS

Takano et al.; "Vehicle"; U.S. Appl. No. 14/901,379, filed Dec. 28, 2015.

* cited by examiner

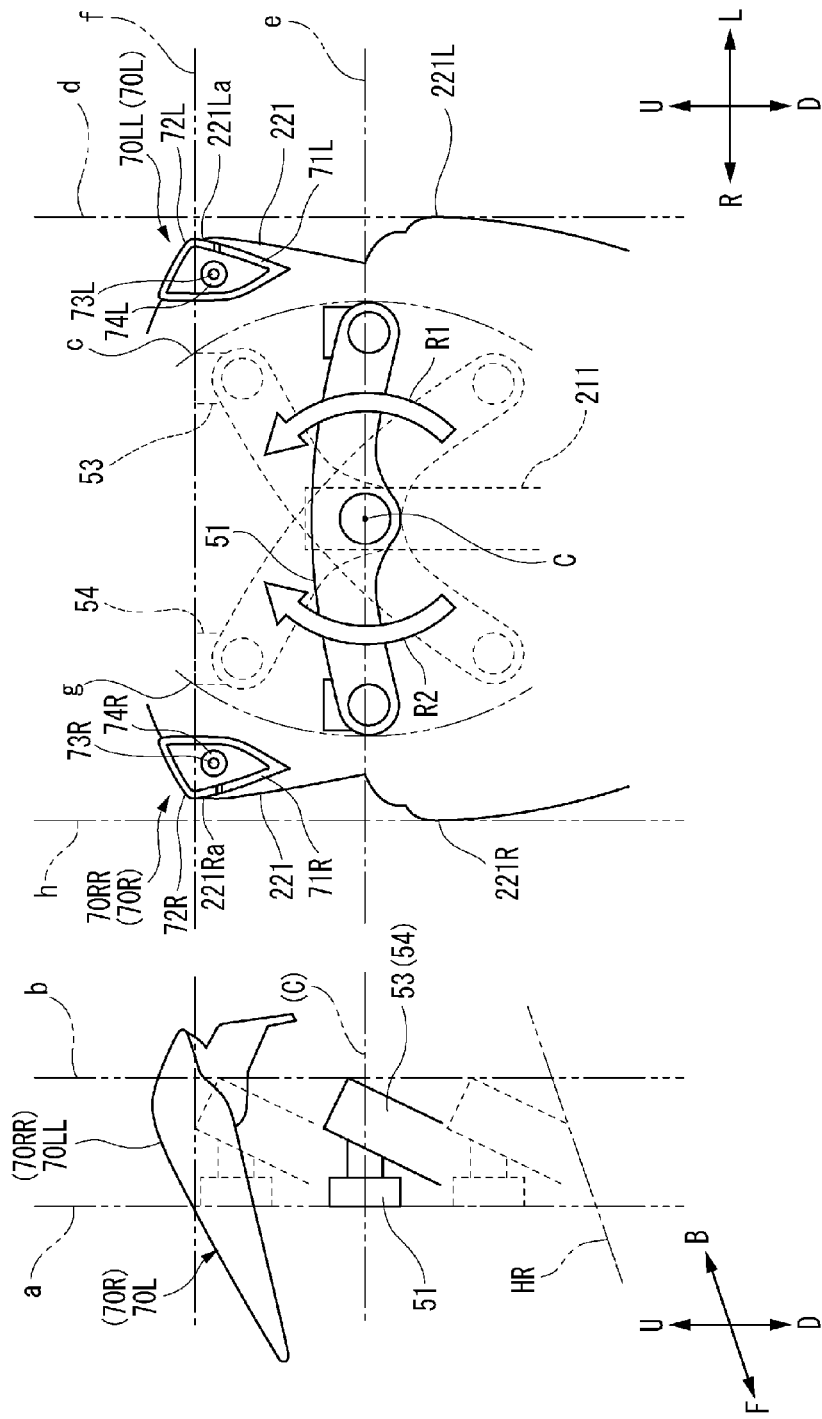

VEHICLE

BACKGROUND OF THE INVENTION

1. Field of the Invention

The present invention relates to a vehicle including a body frame that leans and two front wheels.

2. Description of the Related Art

A vehicle is known which includes a body frame that leans to the right when the vehicle turns right and leans to the left when the vehicle turns left and two front wheels that are aligned in a left-and-right direction of the body frame (for example, refer to Japanese Patent Unexamined Publication No. 2005-313876, German Patent Unexamined Publication No. 102010052716, U.S. Design Pat. D547,242S and Catalogo partidi ricambio, MP3 300ie LT Mod. ZAPM64102, Piaggio).

The vehicle including the body frame that leans and the two front wheels includes a link mechanism. The vehicles described in Japanese Patent Unexamined Publication No. 2005-313876, German Patent Unexamined Publication No. 102010052716, U.S. Design Pat. D547,242S and Catalogo partidi ricambio, MP3 300ie LT Mod. ZAPM64102, Piaggio include a so-called parallelogram-type link mechanism.

The link mechanism includes an upper cross portion and a lower cross portion. In addition, the link mechanism also includes a right side portion which supports right end portions of the upper cross portion and the lower cross and a left side portion which supports left end portions of the upper cross portion and the lower cross portion. Middle portions of the upper cross portion and the lower cross portion are supported on the body frame at the front and rear of a steering shaft.

In the vehicle described in Japanese Patent Unexamined Publication No. 2005-313876, a headstock of the body frame is inclined so that a lower end is positioned ahead of an upper end thereof. The upper cross portion and the lower cross portion are supported on the headstock of the body frame so as to turn about turning axes that extend in a front-and-rear direction. The upper cross portion and the lower cross portion turn relative to the body frame as the body frame leans. When the upper cross portion and the lower cross portion turn, a relative position between the two front wheels in the up-and-down and front-and-rear directions of the body frame changes. It is noted that the upper cross portion and the lower cross portion are provided directly above the two front wheels in the up-and-down direction of the body frame in such a state that the body frame is in the upright state.

The vehicle including the body frame that leans and the two front wheels includes a right shock absorbing device that supports the right front wheel so as to move in the up-and-down direction of the body frame and a left shock absorbing device that supports the left front wheel so as to move in the up-and-down direction of the body frame. The right shock absorbing device is supported on the right side portion so as to turn about a right steering axis that extends in the up-and-down direction. The left shock absorbing device is supported on the left side portion so as to turn about a left steering axis that is parallel to the right steering axis. A right front wheel is supported at a lower portion of the right shock absorbing device. A left front wheel is supported at a lower portion of the left shock absorbing device.

In this manner, in the vehicle described in Japanese Patent Unexamined Publication No. 2005-313876, a distance between the two front wheels is reduced by disposing the link mechanism above the two front wheels. As a result, the widthwise dimension of the vehicle is compact.

Incidentally, in the vehicle including the body frame that leans and the two front wheels whose widthwise dimension is compact, there are concerns that the widthwise dimension of the vehicle is enlarged depending upon how a pair of left and right turn signal lamps are disposed. Then, in the vehicle described in U.S. Design Pat. D547,242S, a pair of left and right turn signal lamps is provided on left and right front mud guards, respectively. In the vehicle described in U.S. Design Pat. D547,242S, by providing the turn signal lamps at those locations, the enlargement in widthwise dimension of the vehicle is prevented while preventing the interference of the right lamp and the left lamp like the left and right turn signal lamps with the link mechanism.

SUMMARY OF THE INVENTION

Preferred embodiments of the present invention provide a vehicle including a body frame that leans and two front wheels which prevents a widthwise enlargement of the vehicle while preventing the interference of a right lamp and a left lamp with a link mechanism even though the right lamp and the left lamp are provided in positions which differ from the conventional positions. According to a preferred embodiment of the present invention, a vehicle includes a body frame that leans to rightward when the vehicle turns right and that leans leftward when the vehicle turns left; a steerable right front wheel and left front wheel that are aligned in a left-and-right direction of the body frame; a right shock absorbing device that supports the right front wheel at a lower portion thereof so as to absorb an upward displacement of the right front wheel in an up-and-down direction of the body frame; a left shock absorbing device that supports the left front wheel at a lower portion thereof so as to absorb an upward displacement of the left front wheel in the up-and-down direction of the body frame; a link mechanism including a right side portion that supports an upper portion of the right shock absorbing device so as to allow the upper portion to turn about a right steering axis that extends in the up-and-down direction of the body frame, a left side portion that supports an upper portion of the left shock absorbing device so as to allow the upper portion to turn about a left steering axis that is parallel to the right steering axis, an upper cross portion that supports, at a right end portion thereof, an upper portion of the right side portion so as to allow the upper portion to turn about an upper right axis that extends in a front-and-rear direction of the body frame and supports, at a left end portion thereof, an upper portion of the left side portion so as to allow the upper portion to turn about an upper left axis that is parallel to the upper right axis, and that is supported at a middle portion thereof on the body frame so as to turn about an upper middle axis that is parallel to the upper right axis and the upper left axis, and a lower cross portion that supports at a right end portion thereof a lower portion of the right side portion so as to allow the lower portion to turn about a lower right axis that is parallel to the upper right axis, and supports at a left end portion thereof a lower portion of the left side portion so as to allow the lower portion to turn about a lower left axis that is parallel to the upper left axis, and that is supported at a middle portion thereof on the body frame so as to turn about a lower middle axis that is parallel to the upper middle axis; a body cover that covers at least a portion of the link mechanism; and a right lamp and a left lamp that are aligned in the left-and-right direction of the body frame, the right lamp including a right light source and the left lamp including a left light source; wherein the right lamp includes a right link side portion that is located behind a front end portion of the link mechanism that is located above the upper middle axis in the up-and-down direction of the body frame and ahead of a rear end portion of the link mechanism that is located above the upper middle axis in the up-and-down direction of the body frame, in a side view of the vehicle in an upright state; the right link side portion is located on the right of a locus along which the link mechanism extends when the upper cross portion turns relative to the body frame in relation to the left-and-right direction of the body frame, when looking at the vehicle in the upright state from the front of the upper middle axis; at least a portion of the right link side portion is located on the left of a right end portion of the body cover in the left-and-right direction of the body frame, above the upper middle axis in the up-and-down direction of the body frame, and below an upper end portion of the link mechanism in relation to the up-and-down direction of the body frame that results when the upper cross portion turns clockwise to a maximum extent relative to the body frame, when looking at the vehicle in the upright state from the front of the upper middle axis; the left lamp includes a left link side portion that is located behind the front end portion of the link mechanism that is located above the upper middle axis in the up-and-down direction of the body frame and ahead of the rear end portion of the link mechanism that is located above the upper middle axis in the up-and-down direction of the body frame in relation to the direction of the upper middle axis, in the side view of the vehicle in the upright state; the left link side portion is located on the left of a locus along which the link mechanism extends when the upper cross portion turns relative to the body frame in the left-and-right direction of the body frame, when looking at the vehicle in the upright state from the front of the upper middle axis; and at least a portion of the left link side portion is located on the right of a left end portion of the body cover in the left-and-right direction of the body frame, above the upper middle axis in the up-and-down direction of the body frame, and below an upper end portion of the link mechanism in relation to the up-and-down direction of the body frame that results when the upper cross portion turns counterclockwise to a maximum extent relative to the body frame, when looking at the vehicle in the upright state from the front of the upper middle axis.

According to a preferred embodiment of the present invention, when looking at the body frame in the upright state from the front of the upper middle axis, a locus along which the link mechanism extends when the upper cross portion turns relative to the body frame is reduced in dimension in the left-and-right direction of the body frame as the locus extends upward. In a preferred embodiment of the present invention, the left lamp and the right lamp are disposed as follows by using the characteristics of the link mechanism.

The right lamp is disposed on the right of the locus along which the link mechanism extends in the left-and-right direction of the body frame, when looking at the body frame in the upright state from the front in the direction of the upper middle axis. The left lamp is disposed on the left of the locus along which the link mechanism extends in the left-and-right direction of the body frame, when looking at the body frame in the upright state from the front of the upper middle axis.

Moreover, when looking at the body frame in the upright state from the front of the upper middle axis, at least a portion of the right lamp is disposed on the left of the right end portion of the body cover in the left-and-right direction of the body frame, above the upper middle axis in the up-and-down direction of the body frame, and below the upper end portion of the link mechanism in relation to the up-and-down direction of the body frame that results when the upper cross portion turns clockwise to the maximum extent relative to the body frame. At least a portion of the left link side portion is located on the right of the left end portion of the body cover in the left-and-right direction of the body frame, above the upper middle axis in the up-and-down direction of the body frame, and below the upper end portion of the link mechanism in relation to the up-and-down direction of the body frame that results when the upper cross portion turns counterclockwise to the maximum extent relative to the body frame, when looking at the vehicle in the upright state from the front of the upper middle axis.

This prevents the left lamp and the right lamp from being disposed in positions that are spaced apart farther than necessary in the left-and-right direction of the body frame or in the vehicle's width direction.

Consequently, the enlargement in size of the vehicle in its width direction is prevented while preventing the interference of the right lamp and the left lamp with the link mechanism.

According to a preferred embodiment of the present invention, the following configuration may be used. The vehicle includes a middle lamp between the right lamp and the left lamp in the left-and-right direction of the body frame when looking at the vehicle in the upright state from the front thereof, and at least a portion of the middle lamp is located below the right lamp and the left lamp in the up-and-down direction of the body frame and ahead of the link mechanism in relation to the direction of the upper middle axis.

The right lamp and the left lamp are disposed on the right and the left of the loci along which the link mechanism extends in the left-and-right direction of the body frame, respectively, in the front view of the vehicle in the upright state. This enhances the degree of freedom in designing the space directly ahead of the link mechanism in the front-and-rear direction of the body frame. Additionally, the space directly ahead of the link mechanism defines an area where the constituent members of the link mechanism do not extend even though the link mechanism is activated to operate. In particular, even though the middle lamp such as the headlamp is disposed in the space directly ahead of the link mechanism, it is possible to prevent the interference of the middle lamp with the link mechanism.

Moreover, when at least a portion of the middle lamp is disposed below the right lamp and the left lamp in the up-and-down direction of the body frame, the right lamp, the middle lamp, and the left lamp are prevented from being aligned on a straight line but are disposed in an inverted triangle. Because of this, the middle lamp, the left lamp, the right lamp and the middle lamp are not aligned in the same position in relation to the up-and-down direction of the body frame, and therefore, the enlargement in size of the vehicle in its width direction is prevented. Consequently, the enlargement in size of the vehicle in its width direction is prevented while preventing the interference of the right lamp and the left lamp with the link mechanism. Additionally, a space between the right lamp and the middle lamp and a space between the left lamp and the middle lamp is increased.

According to a preferred embodiment of the present invention, the following configuration may be used. The body cover includes a right opening portion and a left opening portion, a portion of the right link side portion is located inward of the right opening portion in the body cover while another portion thereof is located outward of the right opening portion in the body cover, and a portion of the left link side portion is located inward of the left opening portion in the body cover while anther portion thereof is located outward of the left opening portion in the body cover.

The space is located inward of the body cover and between the body cover and the link mechanism to prevent the interference of the body cover with the link mechanism. According to a preferred embodiment of the present invention, the left lamp and the right lamp are disposed in the space provided inward of the body cover and the between the body cover and the link mechanism. Consequently, the enlargement in size of the vehicle in its width direction is prevented while preventing the interference of the right lamp and the left lamp with the link mechanism.

According to a preferred embodiment of the present invention, the following configuration may be used. The right link side portion is located outward of the right opening portion in the body cover and includes at least a portion of a right outer cover that transmits light from the right light source, and the left link side portion is located outward of the left opening portion in the body cover and includes at least a portion of a left outer cover that transmits light from the left light source.

The right link side portion includes at least a portion of the right outer cover that defines a light emitting surface, and the left link side portion includes at least a portion of the left outer cover that defines a light emitting surface. Because of this, even though the light emitting surfaces are disposed in high positions, the enlargement in size of the vehicle in its width direction is prevented while preventing the interference of the right lamp and the left lamp with the link mechanism.

According to a preferred embodiment of the present invention, the following configuration may be used. The right lamp includes a right mounting portion where the right lamp is fixed to the body frame, at least a portion of the right mounting portion is located ahead of the front end portion of the link mechanism that is located above the upper middle axis in the up-and-down direction of the body frame, and behind the rear end portion of the link mechanism that is located above the upper middle axis in the up-and-down direction of the body frame in relation to the direction of the upper middle axis, the left lamp includes a left mounting portion where the left lamp is fixed to the body frame, and at least a portion of the left mounting portion is located ahead of the front end portion of the link mechanism that is located above the upper middle axis in the up-and-down direction of the body frame or is located behind the rear end portion of the link mechanism that is located above the upper middle axis in the up-and-down direction of the body frame in relation to the direction of the upper middle axis.

Rigidity is required on a mounting portion which supports a lamp on a body frame, which tends to increase the size of the mounting portion. According to a preferred embodiment of the present invention, the left lamp and the right lamp are preferably mounted on the vehicle while preventing the interference of the lamps with the link mechanism by providing the left and right mounting portions by using a portion of the space provided directly ahead or behind the link mechanism that provides the high degree of freedom in design and that prevents interference with the link mechanism. Because of this, compared with a case where left and right mounting portions are provided on the left link side portion and the right link side portion, respectively, the enlargement in size of the vehicle in its width direction is prevented. It is noted that fixing the lamps to the body frame includes not only a case where the lamps are fixed directly to the body frame but also a case where the lamps are fixed indirectly to the body frame via the body cover, brackets and the like. Consequently, the enlargement in size of the vehicle in its width direction is prevented while preventing the interference of the right lamp and the left lamp with the link mechanism.

According to a preferred embodiment of the present invention, the following configuration may be used. The body cover includes a right opening portion and a left opening portion, the right link side portion includes a right housing that accommodates at least a portion of the right light source, at least a portion of the right housing is located outward of the right opening portion, the left link side portion includes a left housing that accommodates at least a portion of the left light source, and at least a portion of the left housing is located outward of the left opening portion.

Since at least a portion of the right housing is located outward of the right opening portion and at least a portion of the left housing is located outward of the left opening portion, the body cover is compact. In addition, since the left and right housings are provided at the outward portions of the body cover, it is easier to prevent the interference of the link mechanism that is located inward of the body cover with the right lamp and the left lamp. Because of this, the enlargement in size of the vehicle in its width direction is prevented while preventing the interference of the right lamp and the left lamp with the link mechanism.

According to a preferred embodiment of the present invention, the following configuration may be used. The right lamp includes a right mounting portion where the right lamp is fixed to the body frame, and the right link side portion includes at least a portion of the right mounting portion, while the left lamp includes a left mounting portion where the left lamp is fixed to the body frame, and the left link side portion includes at least a portion of the left mounting portion.

Rigidity is required on a mounting portion which supports a lamp on a body frame, which tends to increase the size of the mounting portion. According to a preferred embodiment of the present invention, the left lamp and the right lamp are preferably mounted on the vehicle while preventing the interference of the lamps with the link mechanism and preventing the enlargement in size of the vehicle in its width direction by using the spaces on the right and left of the link mechanism. Even though the left and right mounting portions are provided at the left link side portion and the right link side portion, compared with a case where the left and right mounting portions are provided at the left link side portion and the right link side portion without using the spaces on the right and left of the link mechanism, the enlargement in size of the vehicle in its width direction is prevented. Consequently, the enlargement in size of the vehicle in its width direction is prevented while preventing the interference of the right lamp and the left lamp with the link mechanism. It is noted that fixing the lamps to the body frame includes not only a case where the lamps are fixed directly to the body frame but also a case where the lamps are fixed indirectly to the body frame via the body cover, brackets and the like.

According to a preferred embodiment of the present invention, the following configuration may be used. The right lamp includes a right outer cover that transmits light from the right light source, a front end portion of the right outer cover is located ahead of the front end portion of the link mechanism that is located above the upper middle axis in the up-and-down direction of the body frame in relation to the direction of the upper middle axis, the left lamp includes a left outer cover that transmits light from the left light source, and a front end portion of the left outer cover is located ahead of the front end portion of the link mechanism that is located above the upper middle axis in the up-and-down direction of the body frame in relation to the direction of the upper middle axis.

The right lamp and the left lamp are disposed on the right and the left of the loci of the link mechanism in relation to the left-and-right direction of the body frame, respectively, in the front view of the vehicle in the upright state. In particular, since the left lamp and the right lamp are disposed in the left-and-right direction of the body frame in the link mechanism while preventing the interference thereof with the link mechanism, the degree of freedom is increased in designing the space directly ahead of the link mechanism in the front-and-rear direction of the body frame. Additionally, the space directly ahead of the link mechanism defines an area where the constituent members of the link mechanism do not extend even though the link mechanism is activated to operate. According to a preferred embodiment of the present invention, the left link side portion and the right link side portion are prevented from being enlarged in size by using a portion of the space having the high degree of freedom in design and that does not interfere with the link mechanism. Moreover, the right lamp and the left lamp are preferably elongated in shape along the upper middle axis. Consequently, the enlargement in size of the vehicle in its width direction is prevented while preventing the interference of the right lamp and the left lamp with the link mechanism.

According to a preferred embodiment of the present invention, the following configuration may be used. The right link side portion of the right lamp includes at least a portion of a right light source portion, and the left link side portion of the left lamp includes at least a portion of a left light source portion.

The left and right light source portions that emit light are preferably disposed in high positions on the vehicle. Additionally, the right light source portion and the left light source are disposed in positions that are spaced away from each other in the left-and-right direction of the body frame. Consequently, even though the light source portions are disposed in positions on the vehicle that are high and spaced away from each other in the left-and-right direction, the enlargement in size of the vehicle in its width direction is prevented while preventing the interference of the right lamp and the left lamp with the link mechanism.

According to a preferred embodiment of the present invention, the following configuration may be used. The right lamp includes a right reflecting portion that reflects light, the right link side portion includes at least a portion of the right reflecting portion, the left lamp includes a left reflecting portion that reflects light, and the left link side portion includes at least a portion of the left reflecting portion.

The left and right reflecting portions that reflect light are preferably disposed in high positions on the vehicle. Additionally, the right reflecting portion and the left reflecting portion are disposed in positions that are spaced away from each other in the left-and-right direction of the body frame. Consequently, even though the reflecting portions are disposed in positions on the vehicle that are high and spaced away from each other in the left-and-right direction, the enlargement in size of the vehicle in its width direction is prevented while preventing the interference of the right lamp and the left lamp with the link mechanism.

According to a preferred embodiment of the present invention, the following configuration may be used. The right lamp includes a right wiring that is connected to the light source, the right wiring is fixed to the body frame in a position that is located ahead of the front end portion of the link mechanism that is located above the upper middle axis in the up-and-down direction of the body frame or behind the rear end portion of the link mechanism that is located above the upper middle axis in the up-and-down direction of the body frame in relation to the direction of the upper middle axis, the left lamp includes a left wiring that is connected to the left light source, and the left wiring is fixed to the body frame in a position that is located ahead of the front end portion of the link mechanism that is located above the upper middle axis in the up-and-down direction of the body frame or behind the rear end portion of the link mechanism that is located above the upper middle axis in the up-and-down direction of the body frame in relation to the direction of the upper middle axis.

According to a preferred embodiment of the present invention, the right wiring and the left wiring are fixed to the body frame in such a state that the right wiring and the left wiring extend forward or rearward. Because of this, the right wiring and the left wiring is prevented from interfering with the link mechanism. In addition, it is prevented that the right wiring is fixed to the right link side portion or that the left wiring is fixed to the left link side portion. Consequently, the enlargement in size of the vehicle in its width direction is prevented while preventing the interference of the right lamp and the left lamp with the link mechanism. It is noted that fixing the lamps to the body frame includes not only a case where the lamps are fixed directly to the body frame but also a case where the lamps are fixed indirectly to the body frame via the body cover, brackets and the like. In addition, a case is also included where the left and right wirings are fixed to the left lamp and the right lamp, respectively.

According to a preferred embodiment of the present invention, the following configuration may be used. A right end portion of the right link side portion of the right lamp is located on the left of the right end portion of the body cover in the left-and-right direction of the body frame when looking at the vehicle in the upright state from the front of the upper middle axis, and a left end portion of the left link side portion of the left lamp is located on the right of the left end portion of the body cover in the left-and-right direction when looking at the vehicle in the upright state from the front of the upper middle axis.

According to a preferred embodiment of the present invention, in relation to the left-and-right direction of the body frame, the entire right lamp is not provided on the right of the right end portion of the body cover, and the entire left lamp is not provided on the left of the left end portion of the body cover, so that the enlargement in size of the vehicle in its width direction is prevented. Consequently, the enlargement in size of the vehicle in its width direction is prevented while preventing the interference of the right lamp and the left lamp with the link mechanism.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 10A and 10B show schematic views illustrating a positional relationship between a link mechanism and the turn signal lamps.

DETAILED DESCRIPTION OF THE PREFERRED EMBODIMENTS

Hereinafter, preferred embodiments of the present invention will be described by reference to the accompanying drawings.

In the preferred embodiments of the present invention, a vehicle including two front wheels and one rear wheel will be described as an example of the vehicle.

Figure 1:
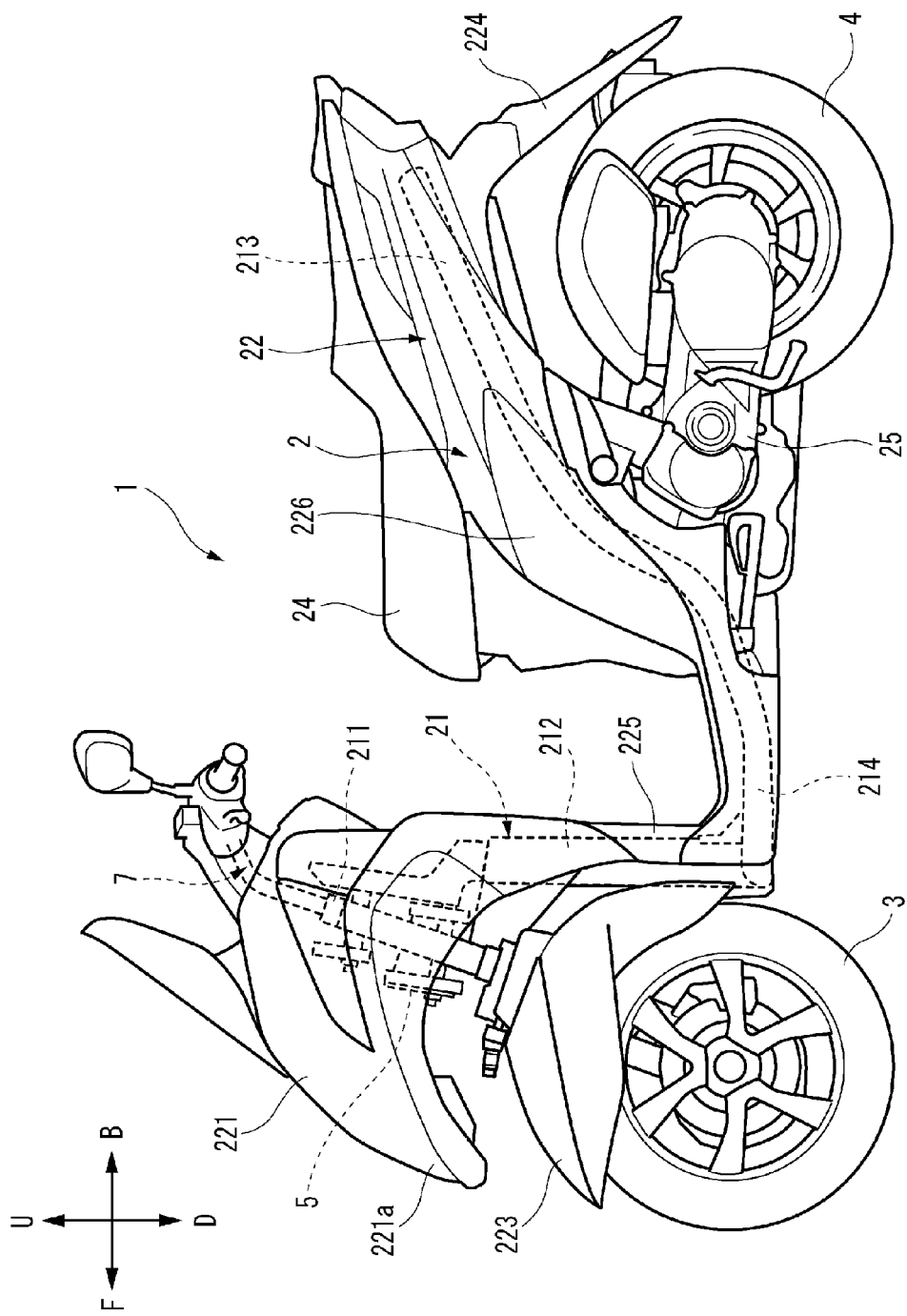
FIG. 1 is an overall side view of a vehicle according to a preferred embodiment of the present invention.

FIG. 1 is a side view of the whole of a vehicle 1 as viewed from the left thereof. Hereinafter, in the drawings, an arrow F denotes a forward direction of the vehicle 1 and an arrow B denotes a rearward direction of the vehicle 1. An arrow U denotes an upward direction of the vehicle 1 and an arrow D denotes a downward direction of the vehicle 1. When forward, rearward, leftward, and rightward directions are referred to in the following description, they mean forward, rearward, leftward, and rightward directions as seen from a rider of the vehicle 1. An up-and-down direction means a vertical direction and also a substantially up-and-down direction which inclines from the vertical direction. A center in a vehicle's width direction means a central position of the vehicle 1 in the vehicle's width direction. A left-and-right direction means a horizontal direction and also a substantially left-and-right direction which inclines from the horizontal direction. The right in the vehicle's width direction means a direction directed from the center in the vehicle's width direction toward the right. The left in the vehicle's width direction means a direction directed from the center in the vehicle's width direction toward the left. An unloaded state of the vehicle means a state in which the vehicle 1 is in the upright state with front wheels neither steered nor caused to lean in such a state that no rider rides on and no fuel is put in the vehicle 1.

As shown in FIG. 1, the vehicle 1 includes a vehicle main body portion 2, a pair of left and right front wheels 3 (refer to FIG. 2), a rear wheel 4, a steering mechanism 7, and a link mechanism 5. The vehicle main body portion 2 includes a body frame 21, a body cover 22, a seat 24, and a power unit 25.

The body frame 21 includes a headstock 211, a down frame 212, an under frame 214, and a rear frame 213. In FIG. 1, in the body frame 21, portions that are hidden by the body cover 22 are shown by broken lines. The body frame 21 supports the power unit 25, the seat 24 and the like. The power unit 25 includes a drive source such as an engine, an electric motor or the like, a transmission and the like.

The head pipe 211 is disposed at a front portion of the vehicle 1. The headstock 211 is slanted with respect to the vertical direction so that, in a side view of the vehicle 1, an upper portion thereof is positioned behind the lower portion thereof. The steering mechanism 7 and the link mechanism 5 are disposed around the headstock 211. A steering shaft 60 of the steering mechanism 7 is turnably inserted into the head pipe 211. The headstock 211 supports the link mechanism 5.

The headstock 211 is a portion of the body frame 21 and is allowed to lean to the right of the vehicle 1 when the vehicle 1 turns right and to lean to the left of the vehicle 1 when the vehicle 1 turns left.

The down frame 212 is connected to the headstock 211. The down frame 212 is disposed behind the headstock 211 and extends along the up-and-down direction. The under frame 214 is connected to a lower portion of the down frame 212. The under frame 214 extends rearward from the lower portion of the down frame 212. The rear frame 213 is disposed behind the under frame 214 and extends rearward and upward. The rear frame 213 supports the seat 24, the power unit 25, a tail lamp and the like.

The body frame 21 is covered by the body cover 22. The body cover 22 includes a front cover 221, a pair of left and right mudguards 223, a leg shield 225, and center covers 226, and a rear mudguard 224.

The front cover 221 is arranged directly ahead of the seat 24. The front cover 221 covers at least portions of the steering mechanism 7 and the link mechanism 5. The front cover 221 includes a front portion 221a that is disposed ahead of the link mechanism 5. In the side view of the vehicle 1 in the unloaded state, the front portion 221a of the front cover 221 is disposed behind front ends of the front wheels 3. In the side view of the vehicle 1 in the unloaded state, the front portion 221a of the front cover 221 is disposed behind front ends of the front wheels 3. The leg shield 225 is disposed below the front cover 221 and ahead of the seat 24. The center cover 226 is disposed so as to cover the circumference of the rear frame 213.

The pair of left and right front mudguards 223 (see FIG. 2) is disposed directly below the front cover 221 and directly above the pair of front wheels 3. The rear mudguard 224 is disposed directly above a rear portion of the rear wheel 4.

The pair of left and right front wheels 3 is disposed below the headstock 211 and directly below the front cover 221 when the vehicle 1 is unloaded. The rear wheel 4 is disposed below the center cover 226 and the rear mudguard 224.

Figure 2:
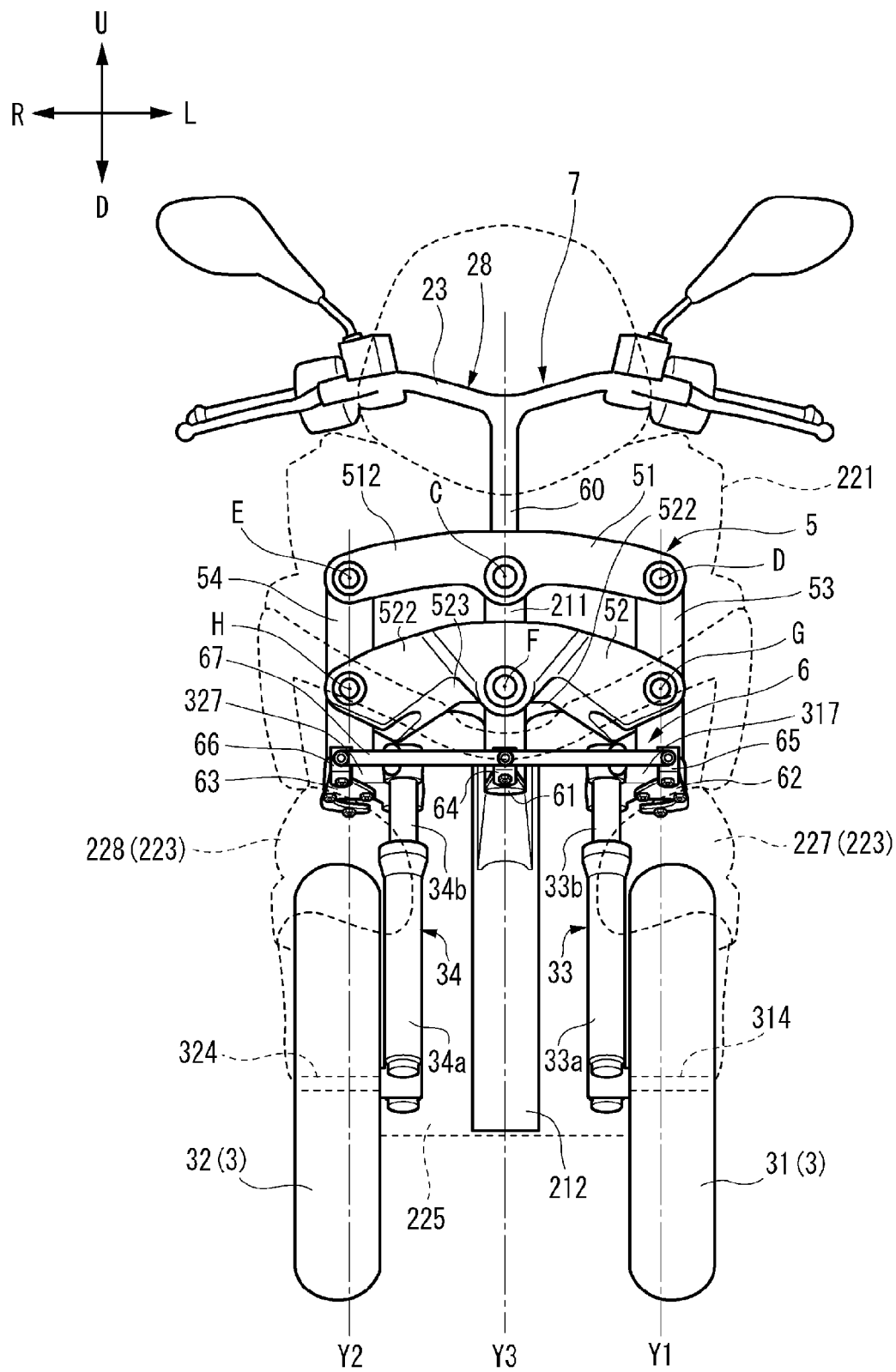
FIG. 2 is a front view of a front portion of the vehicle shown in FIG. 1.
Figure 3:
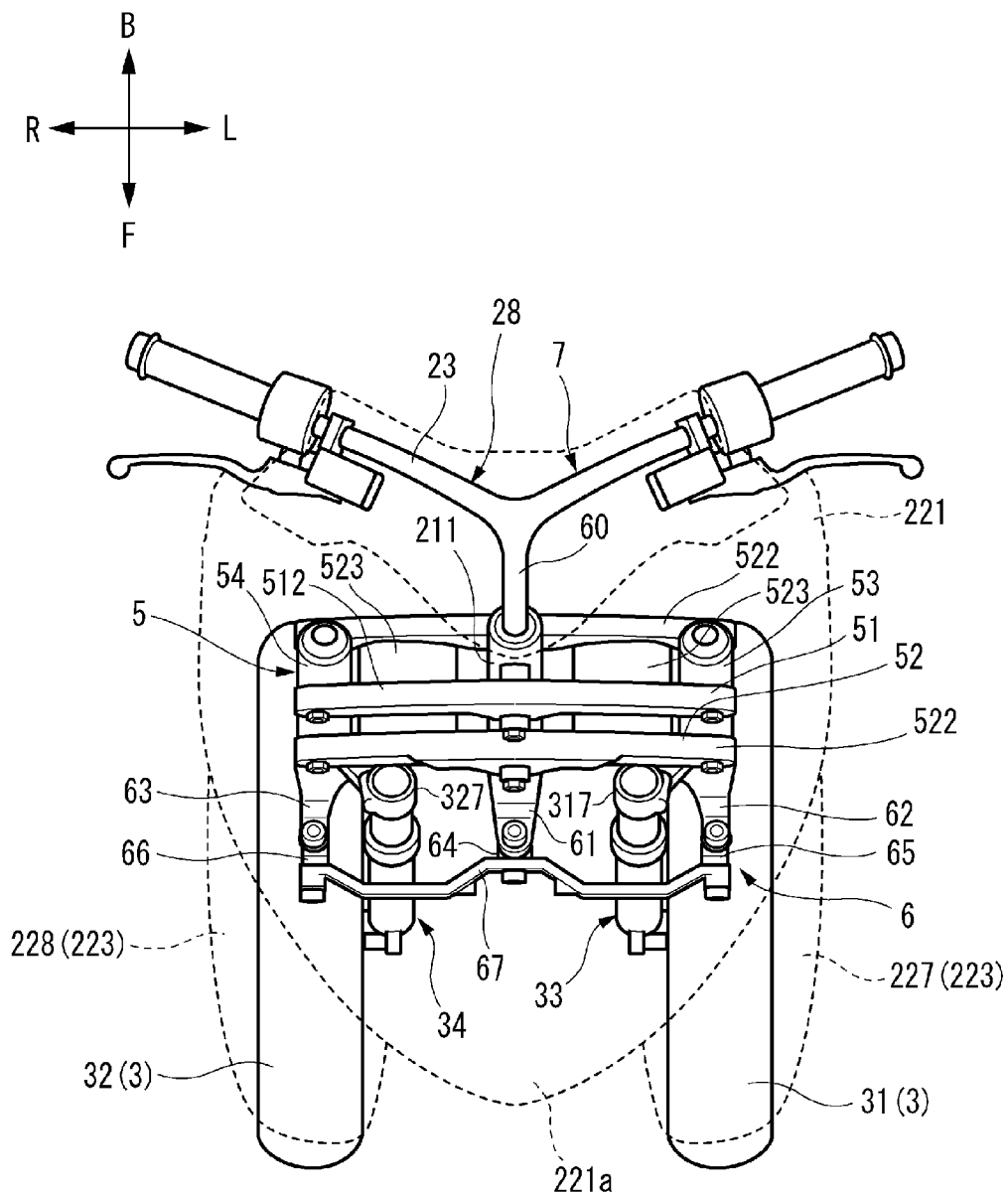
FIG. 3 is a plan view of the front portion of the vehicle shown in FIG. 1.

FIG. 2 is a front view of the vehicle 1 shown in FIG. 1 which results when a front portion of the vehicle 1 is seen from the front thereof. FIG. 3 is a plan view of the vehicle 1 shown in FIG. 1 which results when the front portion of the vehicle 1 is seen from thereabove. FIGS. 2 and 3 show the vehicle 1 as seen through the body cover 22.

As shown in FIGS. 2 and 3, the steering mechanism 7 (an example of a wheel turning operation transmission mechanism) includes a steering force transmission mechanism 6, a left shock absorber 33, a right shock absorber 34, and the pair of left and right front wheels 3.

The pair of left and right front wheels 3 includes a left front wheel 31 and a right front wheel 32. The left front wheel 31 and the right front wheel 32 are aligned in the left-and-right direction of the body frame 21. The left front wheel 31 and the right front wheel 32 are disposed laterally symmetrical with each other with respect to a center of the vehicle 1 in relation to the vehicle's width direction.

In addition, of the pair of left and right front mudguards 223, a left front mudguard 227 is disposed above the left front wheel 31. Of the pair of left and right front mud guards 223, a right front mud guard 228 is disposed above the right front wheel 32. The left front wheel 31 is supported on the left shock absorber 33. The right front wheel 32 is supported on the right shock absorber 34.

Figure 5:
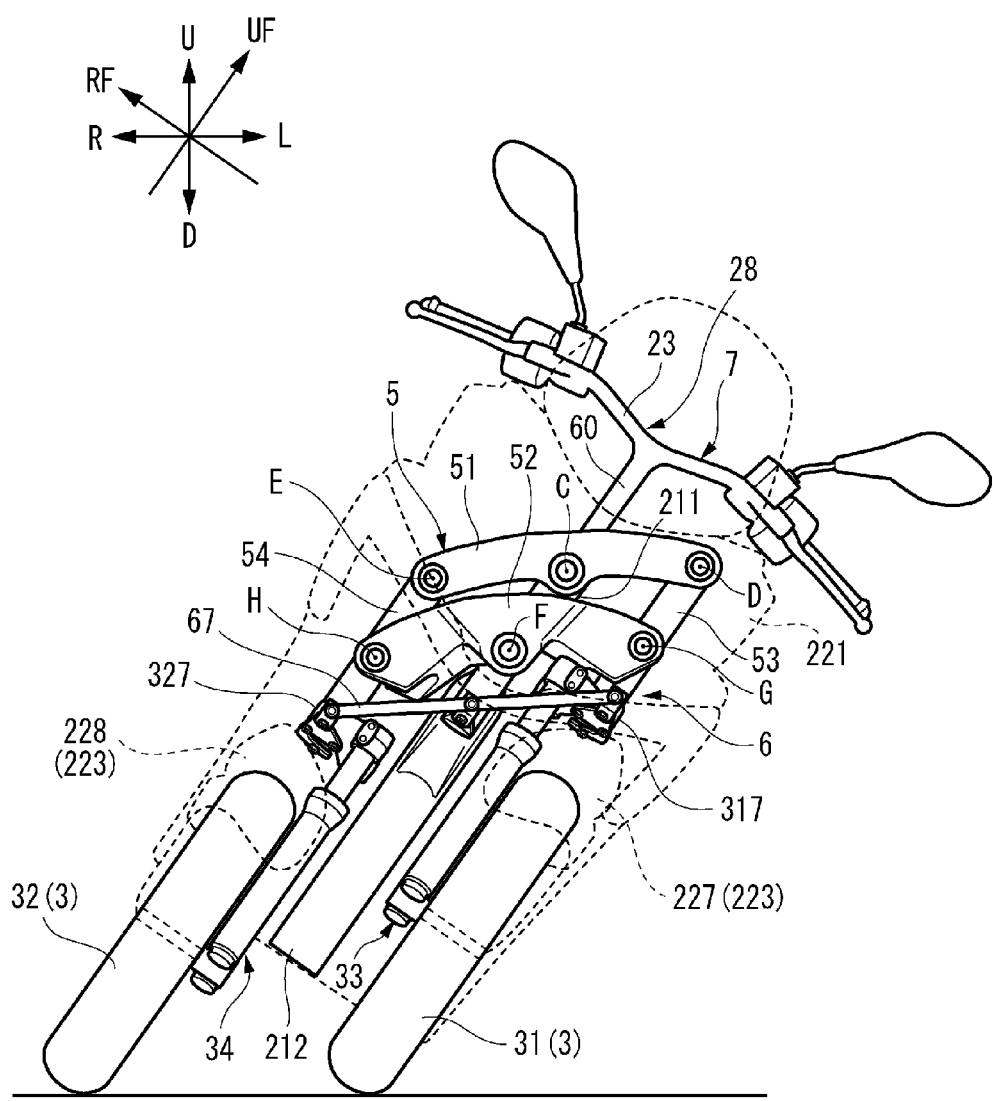
FIG. 5 is a front view of the front portion of the vehicle in a state where the vehicle shown in FIG. 1 is caused to lean.

In this description, the "left-and-right direction of the body frame 21" denotes a direction that intersects at right angles or perpendicular or substantially perpendicular to an axial direction of the headstock 211 in a front view of the vehicle 1. An up-and-down direction of the body frame 21 denotes a direction which extends in an axial direction of the headstock 211 in the front view of the vehicle 1. For example, the up-and-down direction of the body frame 21 coincides with the axial direction of the headstock 211 in the front view of the vehicle 1. As shown in FIG. 2, in such a state that the vehicle 1 is in an upright state, a rightward direction RF of the body frame 21 coincides with a rightward direction R in a horizontal direction when the vehicle 1 is viewed front the front thereof. Because of this, only the rightward direction R in the horizontal direction is shown in FIG. 2. As shown in FIG. 5, in such a state that the vehicle 1 leans relative to a road surface, in the front view of the vehicle 1, the rightward direction RF of the body frame 21 does not coincide with the rightward direction R in the horizontal direction, and an upward direction UF of the body frame 21 does not coincide with an upward direction U in the vertical direction.

The left shock absorber (an example of a left shock absorbing device) 33 is preferably a so-called telescopic shock absorber and dampens vibrations from a road surface. The left shock absorber 33 supports the left front wheel 31 at a lower portion thereof and absorbs an upward displacement of the left front wheel 31 in the up-and-down direction of the body frame 21. The left shock absorber 33 includes a first lower-side portion 33a and a first upper-side portion 33b. The left front wheel 31 is supported on the first lower-side portion 33a. The first lower-side portion 33a extends in the up-and-down direction, and a left wheel axle 314 is supported on a lower end side of the first lower-side portion 33a. The left wheel axle 314 supports the left front wheel 31. The left axle shaft 314 extends along a rotating axis Z1 of the left front wheel 31.

The first upper-side portion 33b is disposed at an upper side of the first lower-side portion 33a in such a state that the first upper-side portion 33b is partially inserted into the first lower-side portion 33a. The first upper-side portion 33b moves relative to the first lower-side portion 33a in a direction in which the first lower-side portion 33a extends. An upper portion of the first upper-side portion 33b is fixed to a first bracket 317. In this manner, the left shock absorber 33 supports the left front wheel 31 so as to allow it to be displaced in the up-and-down direction.

The first lower-side portion 33a and the first upper-side portion 33b define two telescopic elements that are aligned parallel in the front-and-rear direction and are connected together. This configuration prevents the first upper-side portion 33b from turning relative to the first lower-side portion 33a.

The right shock absorber (an example of a right suspension device) 34 is preferably a so-called telescopic shock absorber and absorbs vibrations from the road surface. The right shock absorber 34 supports the right front wheel 32 at a lower portion thereof and absorbs an upward displacement of the right front wheel 32 in the up-to-down direction of the body frame 21. The right shock absorber 34 includes a second lower portion 34a and a second upper portion 34b. The right front wheel 32 is supported on the second lower-side portion 34a. The second lower-side portion 34a extends in the up-and-down direction, and a right wheel axle 324 is supported on a lower end side of the second lower-side portion 34a. The right wheel axle 324 supports the right front wheel 32. The right axle shaft 324 extends along a rotating axis Z2 of the right front wheel 32.

The second upper-side portion 34b is disposed at an upper side of the second lower-side portion 34a in such a state that the second upper-side portion 34b is partially inserted into the second lower-side portion 34a. The second upper-side portion 34b moves relative to the second lower-side portion 34a in a direction in which the second lower-side portion 34a extends. An upper portion of the second upper-side portion 34b is fixed to a second bracket 327. In this manner, the right shock absorber 34 supports the right front wheel 32 so as to allow it to be displaced in the up-and-down direction.

The second lower-side portion 34a and the second upper-side portion 34b define two telescopic elements that are aligned parallel in the front-and-rear direction and are connected together. This configuration prevents the second upper-side portion 34b from turning relative to the second lower-side portion 34a.

The steering force transmission mechanism 6 is disposed above the left front wheel 31 and the right front wheel 32. The steering force transmission mechanism 6 includes a steering member 28 that inputs a steering force exerted by a rider. The steering member 28 includes a steering shaft 60 and a handlebar 23 that is connected to an upper portion of the steering shaft 60.

The steering shaft 60 is supported on the headstock 211 between the left shock absorber 33 and the right shock absorber 34 in the left-and-right direction of the body frame 21. Additionally, the steering shaft 60 turns about a middle steering axis Y3 that extends in the up-and-down direction of the body frame 21. With a portion thereof inserted into the headstock 211, the steering shaft 60 is disposed so as to extend in the up-and-down direction and turn relative to the headstock 211. The steering shaft 60 is turned as the rider turns the handlebar 23.

The steering force transmission mechanism 6 turns the left shock absorber 33 about a left steering axis Y1 that extends in the up-and-down direction and turns the right shock absorber 34 about a right steering axis Y2 that is parallel to the left steering axis Y1 in association with the turning of the steering shaft 60 which is triggered in response to the operation of the handlebar 23.

The steering effort transmission mechanism 6 includes, in addition to the steering member 28, a first transmission plate 61, a second transmission plate 62, a third transmission plate 63, a first joint 64, a second joint 65, a third joint 66, a tie-rod 67, the first bracket 317, and the second bracket 327. The steering effort transmission mechanism 6 transmits the steering effort by which the rider operates the handlebar 23 to the first bracket 317 and the second bracket 327 by way of those constituent members.

The first transmission plate 61 is disposed at the center in the vehicle's width direction and is connected to the steering shaft 60 so as not to turn relative to the steering shaft 60. The first transmission plate 61 turns as the steering shaft 60 turns.

The second transmission plate 62 is connected to a left side portion 53 of the link mechanism 5, which will be described below, so as to turn relatively. The second transmission plate 62 is fixed to the first bracket 317. The second transmission plate 62 is disposed below the first bracket 317. The second transmission plate 62 is disposed on the left of the first transmission plate 61.

The third transmission plate 63 is connected to a right side portion 54 of the link mechanism 5, which will be described below, so as to turn relatively. The third transmission plate 63 is disposed laterally symmetrical with the second transmission plate 62 around the first transmission plate 61. The third transmission plate 63 is fixed to the second bracket 327. The third transmission plate 63 is positioned below the second bracket 327.

The first joint 64 is disposed at a front portion of the first transmission plate 61. The first joint 64 is supported by a turning shaft that extends in the up-and-down direction so as to turn relative to the first transmission plate 61. The second joint 65 is disposed at a front portion of the second transmission plate 62. The second joint 65 is supported by a turning shaft that extends in the up-and-down direction so as to turn relative to the second transmission plate 62. The third joint 66 is disposed at a front portion of the third transmission plate 63. The third joint 66 is supported by a turning shaft that extends in the up-and-down direction so as to turn relative to the third transmission plate 63. The first joint 64, the second joint 65, and the third joint 66 each include a shaft portion that extends in the front-and-rear diction at a front portion thereof.

The tie-rod 67 is disposed so as to extend in the vehicle's width direction. The tie-rod 67 is supported so as to turn relative to the shaft portions that extend in the front-and-rear direction at the front portions of the first joint 64, the second joint 65, and the third joint 66. This tie-rod 67 is a portion of the steering force transmission mechanism 6 and moves so as to maintain a parallel relationship with the lower cross portion 52, which will be described below, when the body frame 21 leans.

The steering effort transmission mechanism 6 that is configured in the manner described above transmits the steering effort transmitted from the steering member 28 to the tie rod 67 by way of the first transmission plate 61 and the first joint 64. This causes the tie rod 67 to be displaced either leftward or rightward. The steering force transmitted to the tie-rod 67 is transmitted from the tie-rod 67 to the first bracket 317 via the second transmission plate 62 and the second joint 65 and is transmitted from the tie-rod 67 to the second bracket 327 via the third transmission plate 63 and the third joint 66. As a result, the first bracket 317 and the second bracket 327 turn in the direction in which the tie-rod 67 is displaced.

In this preferred embodiment, the link mechanism 5 is preferably a four-joint or four-bar linkage (also, referred to as a parallelogram linkage).

The link mechanism 5 is disposed below the handlebar 23. The link mechanism 5 is connected to the head pipe 211 of the body frame 21. The link mechanism 5 includes an upper cross portion 51, a lower cross portion 52, a left side portion 53, and a right side portion 54 as a configuration by which the vehicle 1 is caused to lean. Additionally, the link mechanism 5 includes the first bracket 317 and the left shock absorber 33 as a configuration that is connected to a lower portion of the left side portion 53 to lean together with the left side portion 53. Further, the link mechanism 5 includes the second bracket 327 and the right shock absorber 34 as a configuration that is connected to a lower portion of the right side portion 54 to lean together with the right side portion 54.

The right side portion 54 supports an upper portion of the right shock absorber 34 so as to turn about a right steering axis Y2 that extends in the up-and-down direction of the body frame 21. The left side portion 53 supports an upper portion of the left shock absorber 33 so as to turn a left steering axis Y1 that is parallel to the right steering axis Y2.

The upper cross portion 51 supports the upper portion of the right side portion 54 at the right end portion thereof so as to turn around an upper right axis E extending in the front-and-rear direction of the body frame 21, supports the upper portion of the left side portion 53 at the left end portion thereof so as to turn around an upper left axis D which is parallel to the upper right axis E, and the middle portion thereof is supported on the body frame 21 so as to turn around an upper middle axis C which is parallel to the upper right axis E and the upper left axis D.

The lower cross portion 52 supports the lower portion of the right side portion 54 at the right end portion thereof so as to turn around a lower right axis H which is parallel to the upper right axis E, supports the lower portion of the left side portion 53 at the left end portion thereof so as to turn around a lower left axis G which is parallel to the upper left axis E, and the middle portion thereof is supported on the body frame 21 so as to turn around a lower middle axis F which is parallel to the upper middle axis C.

The upper cross portion 51 includes a plate-shaped member 512 that is disposed at a front side of the headstock 211 so as to extend in the vehicle width direction. The plate-shaped member 512 is supported on the headstock 211 by a support portion that is provided at a center in the left-and-right direction and turns relative to the headstock 211 about an upper middle axis C that extends in the front-and-rear direction.

A left end of the upper cross portion 51 is connected to the left side portion 53 by a supporting portion. The upper cross portion 51 turns relative to the left side portion 53 about an upper left axis D that extends in the front-to-rear direction. The right end of the upper cross portion 51 is connected to the right side portion 54 via the connecting portion E. The upper cross portion 51 turns relative to the right side portion 54 about an upper right axis E that extends in the front-to-rear direction.

The lower cross portion 52 is supported on the headstock 211 via the support portion and turns around the lower middle axis F extending in the front-and-rear direction. The lower cross portion 52 is disposed below the upper cross portion 51. The lower cross portion 52 has substantially the same widthwise length as that of the upper cross portion 51 in relation to the vehicle's width direction and is disposed parallel to the upper cross portion 51.

The lower cross portion 52 includes a pair of plate-shaped members 522, 522 that extend in the vehicle's width direction. The pair of plate-shaped members 522, 522 is disposed so as to hold the headstock 211 therebetween in the front-and-rear direction. The pair of plate-shaped members 522, 522 is connected integrally to each other by a middle portion 523. The middle portion 523 may be integral with or separated from the pair of the plate-shaped member 522, 522. A left end of the lower cross portion 52 is connected to the left side portion 53 by a supporting portion. The lower cross portion 52 turns relative to the left side portion 53 about the lower left axis G that extends substantially in the front-and-rear direction. A right end of the lower cross portion 52 is connected to the right side portion 54 by a supporting portion. The lower cross portion 52 turns relative to the right side portion 54 about the lower right axis H that extends substantially in the front-and-rear direction.

The left side portion 53 is on a left side of the headstock 211 and extends parallel to a direction in which the headstock 211 extends. The left side portion 53 is disposed above the left shock absorber 33 directly above the left front wheel 31. The left side portion 53 is connected to the first bracket 317 at a lower portion thereof and is attached so as to turn about the left steering axis Y1 relative to the first bracket 317. This left side portion 53 supports an upper portion of the left shock absorber 33 so as to allow it to turn about the left steering axis Y1.

The right side portion 54 is disposed on a right side of the headstock 211 and extends parallel to the direction in which the headstock 211 extends. The right side portion 54 is disposed above the right shock absorber 34 directly above the right front wheel 32. The right side portion 54 is connected to the second bracket 327 at a lower portion thereof and is attached so as to turn about the right steering axis Y2 relative to the second bracket 327. This right side portion 54 supports an upper portion of the right shock absorber 34 so as to allow it to turn about the right steering axis Y2.

In this manner, the upper cross portion 51, the lower cross portion 52, the left side portion 53, and the right side portion 54 are connected together in such a posture that the upper cross portion 51 and the lower cross portion 52 become parallel to each other and that the left side portion 53 and the right side portion 54 become parallel to each other.

Figure 4:
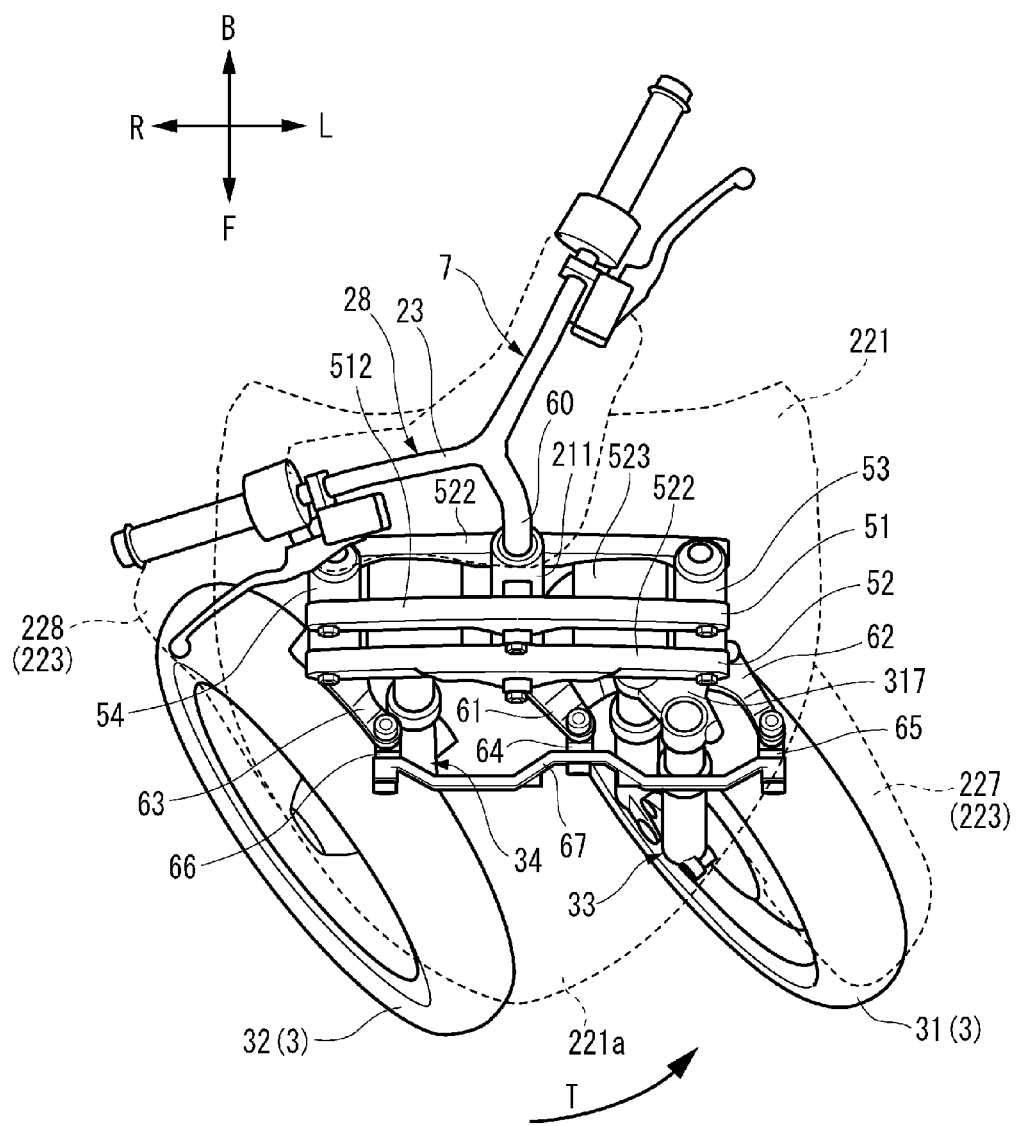
FIG. 4 is a plan view of the front portion of the vehicle in a state where the vehicle shown in FIG. 1 is steered.

FIG. 4 is a plan view of the front portion of the vehicle 1 when the vehicle 1 is steered to be turned, depicting how the vehicle 1 is steered to be turned.

As shown in FIG. 4, when the handlebar 23 is turned in the left-and-right direction, the steering effort transmission mechanism 6 of the steering mechanism 7 is activated to perform a steering operation. When the steering shaft 60 turns as a result of the handlebar 23 being turned, the first transmission plate 61 turns in association with the turning of the steering shaft 60. In particular, the front wheels 3 are turned by the steering force transmission mechanism 6 that moves in response to the turning of the steering shaft 60.

For example, when the steering shaft 60 turns in a direction indicated by an arrow T in FIG. 4, the tie rod 67 moves leftward and rearward in association with the turning of the first transmission plate 61. As this occurs, the first transmission plate 61 is allowed to turn relative to the first joint 64 by the turning shaft that extends in the up-and-down direction of the first joint 64, and the tie-rod 67 moves to the left rear while maintaining its posture. The second transmission plate 62 and the third transmission plate 63 turn in the direction indicated by the arrow T about the left side portion 53 and the right side portion 54, respectively, as the tie-rod 67 moves leftward and rearward. As this occurs, the second transmission plate 62 turns relative to the second joint 65 about the rotating shaft of the second joint 65 that extends in the up-and-down direction, and the third transmission plate 63 turns relative to the third joint 66 about the rotating shaft of the third joint 66 that extends in the up-and-down direction.

When the second transmission plate 62 and the third transmission plate 63 turn in the direction indicated by the arrow T, the first bracket 317 and the second bracket 327 turn in the direction indicated by the arrow T. When the first bracket 317 and the second bracket 327 turn in the direction indicated by the arrow T, the left front wheel 31 turns about the left steering axis Y1 (refer to FIG. 2) via the left shock absorber 33, and the right front wheel 32 turns about the right steering axis Y2 (refer to FIG. 2) via the right shock absorber 34.

FIG. 5 is a front view of the front portion of the vehicle 1 when the vehicle 1 is steered to be turned, depicting a leaning operation of the vehicle 1.

As shown in FIG. 5, the vehicle 1 leans to the left or right as the link mechanism 5 operates. The operation of the link mechanism 5 means that the individual members (the upper cross portion 51, the lower cross portion 52, the left side portion 53, and the right side portion 54) that activate a leaning operation in the link mechanism 5 turn relatively about their connecting points as axes so as to change the shape of the link mechanism 5.

In the link mechanism 5 of this preferred embodiment, for example, the upper cross portion 51, the lower cross portion 52, the left side portion 53, and the right side portion 54 which are disposed so as to define a rectangular or substantially rectangular shape when viewed from the front with the vehicle 1 being in the upright state turn to change their shape into a parallelogram shape in such a state that the vehicle leans. The link mechanism 5 performs a leaning operation in association with the relative turning operation of the upper cross portion 51, the lower cross portion 52, the left side portion 53, and the right side portion 54 to cause the left front wheel 31 and the right front wheel 32 to lean accordingly.

For example, when the rider causes the vehicle 1 to lean to the left, the headstock 211 leans relative to the vertical direction. When the headstock 211 leans, the upper cross portion 51 turns relative to the headstock 211 about the upper middle axis C, and the lower cross portion 52 turns relative to the headstock 211 about the lower middle axis F. Then, the upper cross portion 51 moves to the left than the lower cross portion 52 and the left side portion 53 and the right side portion 54 lean relative to the vertical direction while kept parallel to the headstock 211. The left side portion 53 and the right side portion 54 turn relative to the upper cross portion 51 and the lower cross portion 52 when the left side portion 53 and the right side portion 54 lean. Consequently, when the vehicle 1 is caused to lean, the left front wheel 31 and the right front wheel 32 that are supported on the left side portion 53 and the right side portion 54, respectively, lean while being kept parallel to the headstock 211 relative to the vertical direction as the left side portion 53 and the right side portion 54 lean.

Additionally, as they lean, the tie-rod 67 turns relative to the individual shaft portions, extending in the front-and-rear direction, of the first joint 64, the second joint 65, and the third joint 66. This allows the tie-rod 67 to maintain a parallel posture to the upper cross portion 51 and the lower cross portion 52 even though the vehicle 1 leans.

Figure 6:
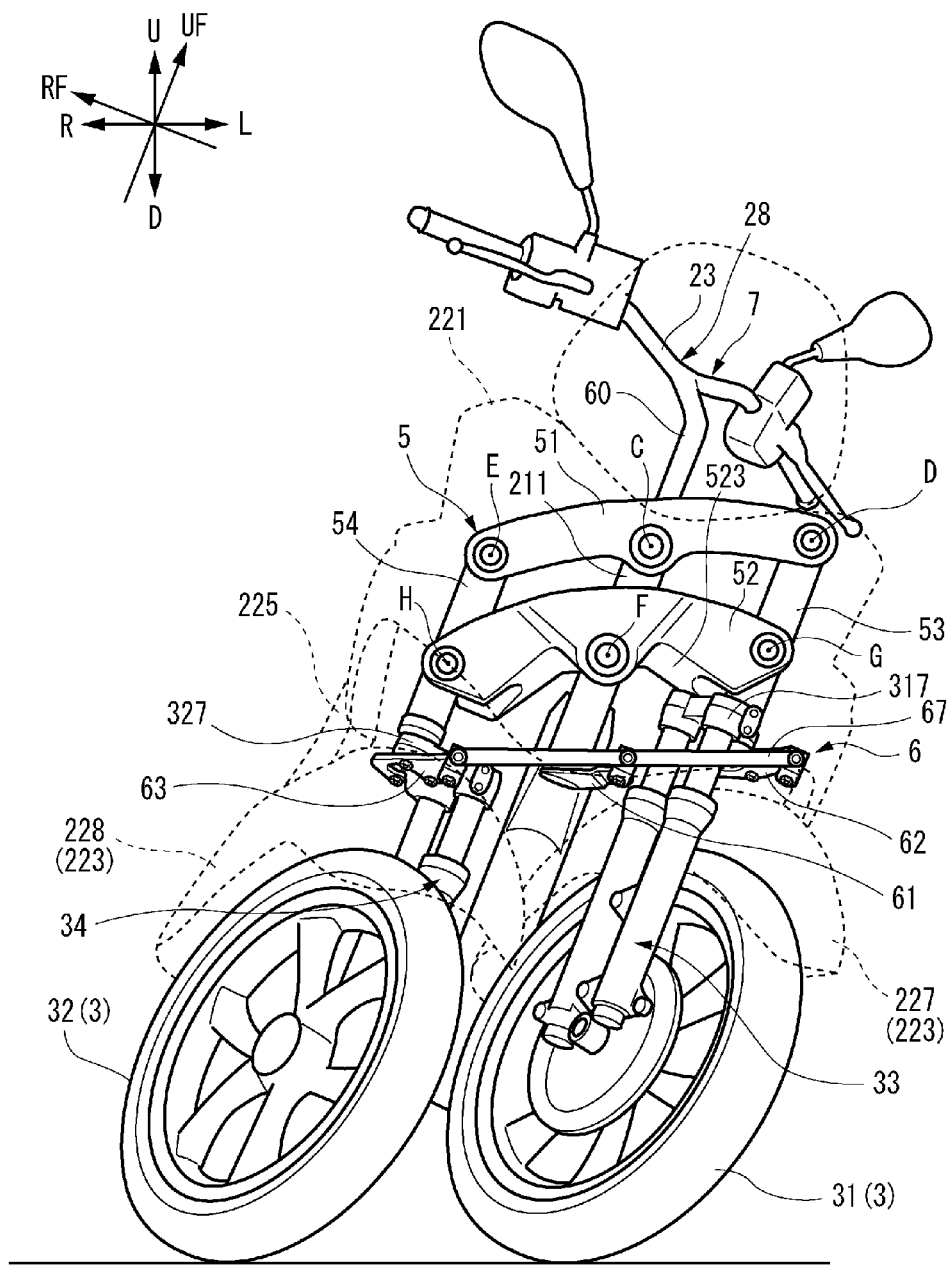
FIG. 6 is a front view of the front portion of the vehicle in a state where the vehicle shown in FIG. 1 is steered and is caused to lean.

FIG. 6 is a front view of the front portion of the vehicle 1 in a state where the vehicle 1 is steered and is caused to lean.

In FIG. 6, the vehicle 1 is steered to the left and is caused to lean to the left thereof. When the vehicle 1 operates as illustrated in FIG. 6, the directions of the left front wheel 31 and the right front wheel 32 are changed by the steering operation, and both the left front wheel 31 and the right front wheel 32 are caused to lean together with the body frame 21 by the leaning operation. In this state, the upper cross portion 51, the lower cross portion 52, the left side portion 53 and the right side portion 54 of the link mechanism 5 are turned to change their shape into a parallelogram shape, so that the tie-rod 67 moves leftward or rightward, that is, in a direction in which the vehicle 1 is steered (leftward in FIG. 6) and rearward.

Next, a mounting member 90 will be described.

Figure 7B:
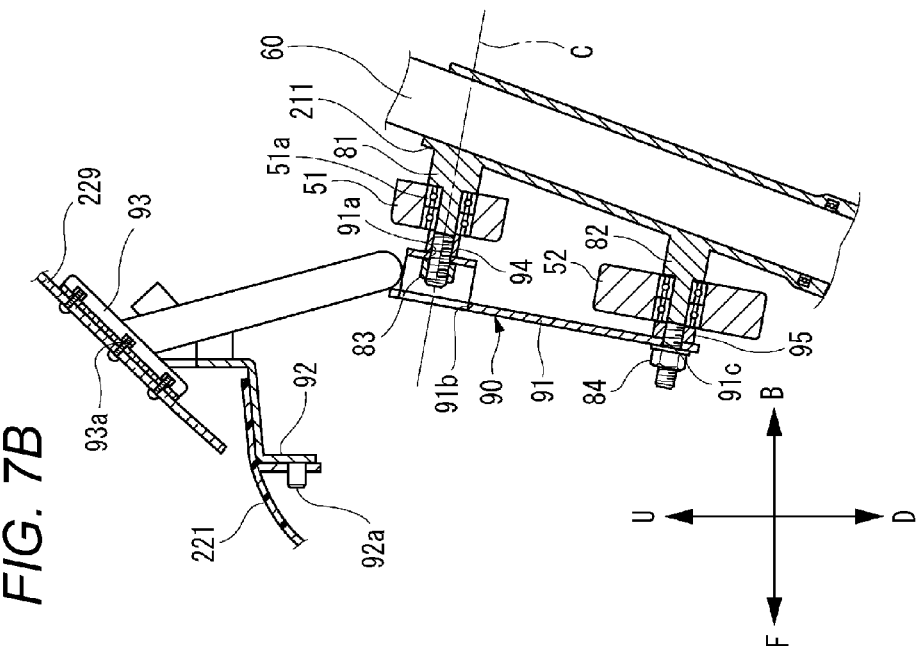
FIGS. 7A and 7B show schematic views showing a mounting member.
Figure 7A:
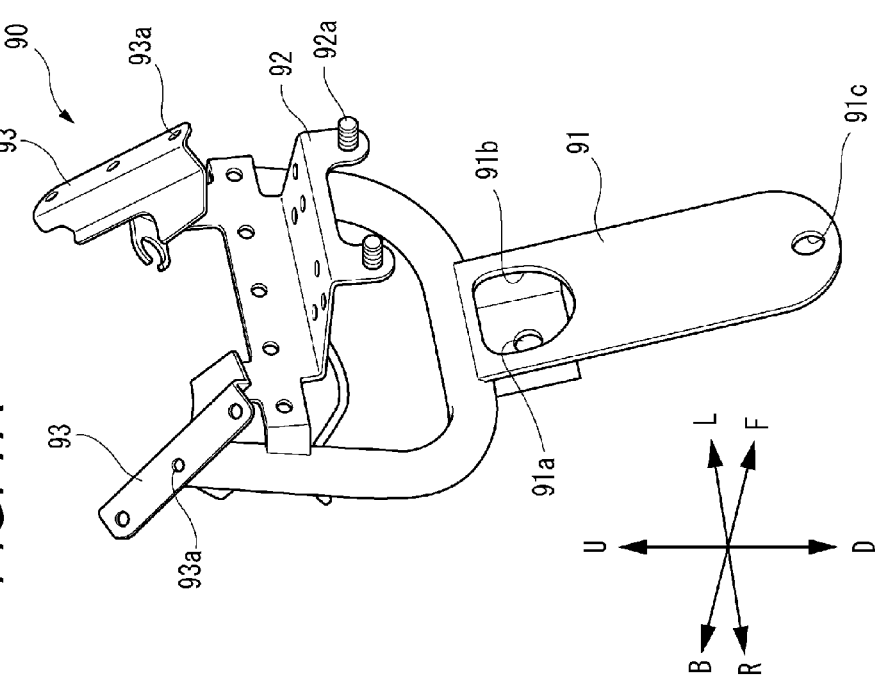

FIG. 7A is a perspective view of a mounting member 90 for mounting the body cover 22 on the headstock 211. FIG. 7B is a view showing how the front cover 221 is mounted on the headstock 211 by the mounting member 90. FIG. 7B is a vertical sectional view taken along the upper middle axis C of the upper cross portion 51. The mounting member 90 includes a plate-shaped portion 91, a front cover support portion 92 and windshield support portions 93.

A first through hole 91a, a second through hole 91b, and a third through hole 91c are provided in the plate-shaped portion 91. The first through hole 91a and the second through hole 91b are provided on the same axis or concentrically, and the second through hole 91b is greater in diameter than the first through hole 91a.

As shown in FIG. 7B, a first penetrating support portion 81 is provided on the headstock 211 to extend therefrom so that the upper middle axis C of the upper cross portion 51 penetrates therethrough. A distal end of the first penetrating support portion 81 penetrates the first through hole 91a and the second through hole 91b. A washer 94 is provided between an inner ring of a bearing 51a of the upper cross portion 51 and the plate-shaped portion 91 of the mounting member 90. Threads 83 are provided at the distal end of the first penetrating support portion 81, so that the plate-shaped portion 91 of the mounting member 90 is fixed to the headstock 211.

Additionally, a second penetrating support portion 82 is provided on the headstock 211 so that a lower middle axis F of the lower cross portion 52 penetrates therethrough. A distal end of this second penetrating support portion 82 penetrates the third through hole 91c. A washer 95 is provided between an inner ring of a bearing 52a of the lower cross portion 52 and the plate-shaped portion 91 of the mounting member 90. Threads 84 are provided at the distal end of the second penetrating support portion 82, so that the plate-shaped portion 91 of the mounting member 90 is fixed to the headstock 211.

The front cover support portion 92 is located above and ahead of the plate-shaped portion 91. The front cover 221 is mounted on threaded portions 92a that are provided on the front cover support portion 92.

The windshield support portions 93 are provided above the front cover support portion 92. Three support holes 93a that are provided on each of the left and right windshield support portions 93 are threaded, so that the windshield 229 is mounted thereon.

In addition to the front cover 221 and the windshield 229, a headlamp and other pieces of vehicle equipment may be mounted on the mounting member 90.

Next, in particular, turn signal lamps 70L, 70R will be described.

Figure 8:
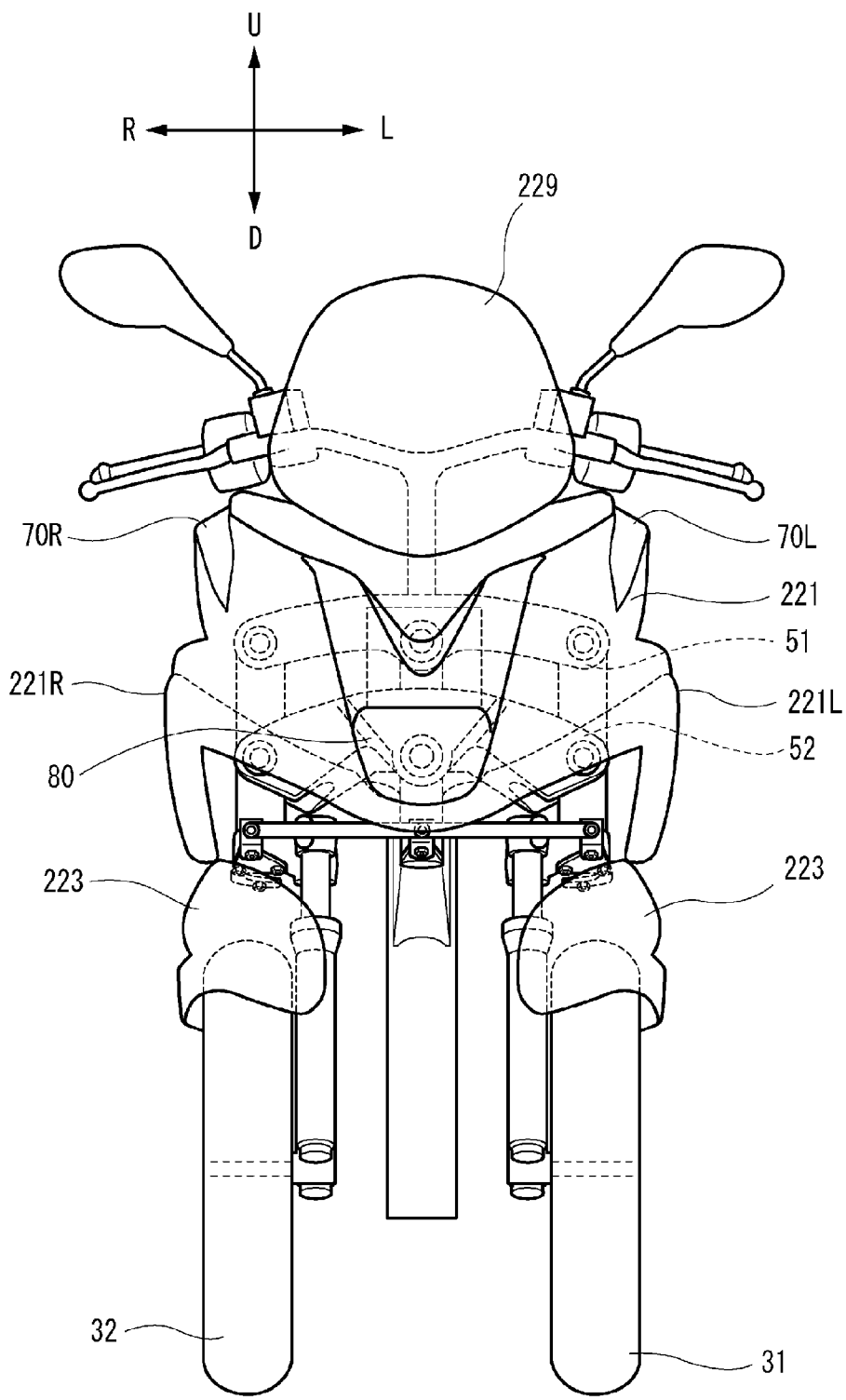
FIG. 8 is a front view of the vehicle that includes turn signal lamps and a headlamp.

FIG. 8 is a front view of the vehicle 1 that includes turn signal lamps 70L, 70R, which are examples of a left lamp and a right lamp, and a headlamp 80, which is an example of a middle lamp. FIG. 8 shows a front view of the vehicle that is in the upright state as viewed from the front of the upper middle axis C.

Figure 9A:
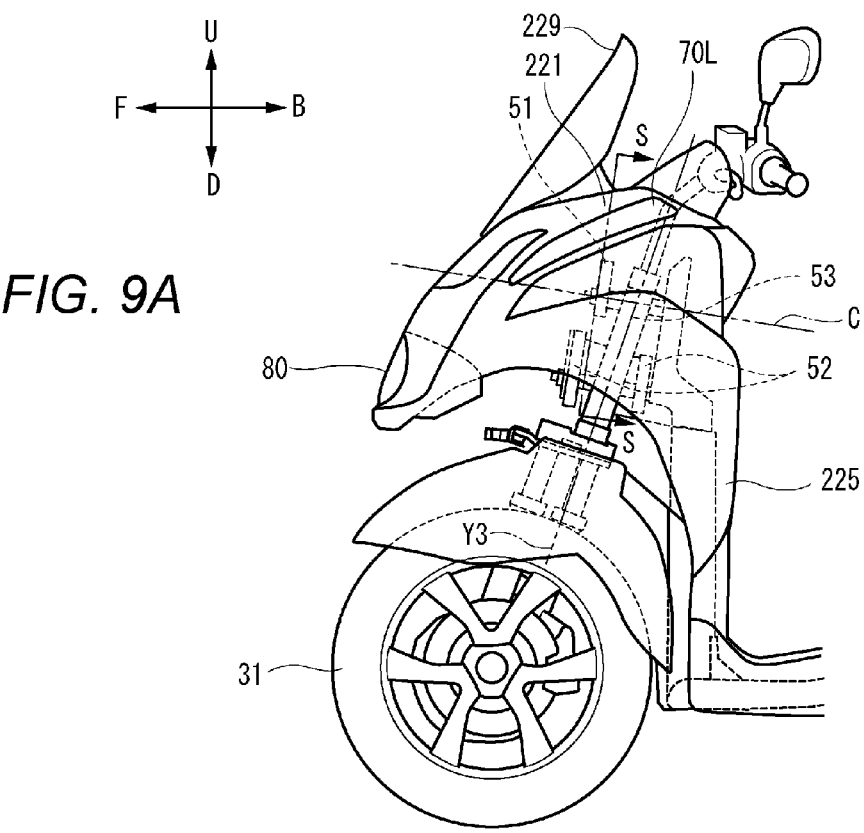
FIGS. 9A and 9B show views of the vehicle that includes the turn signal lamps and the headlamp.
Figure 9B:
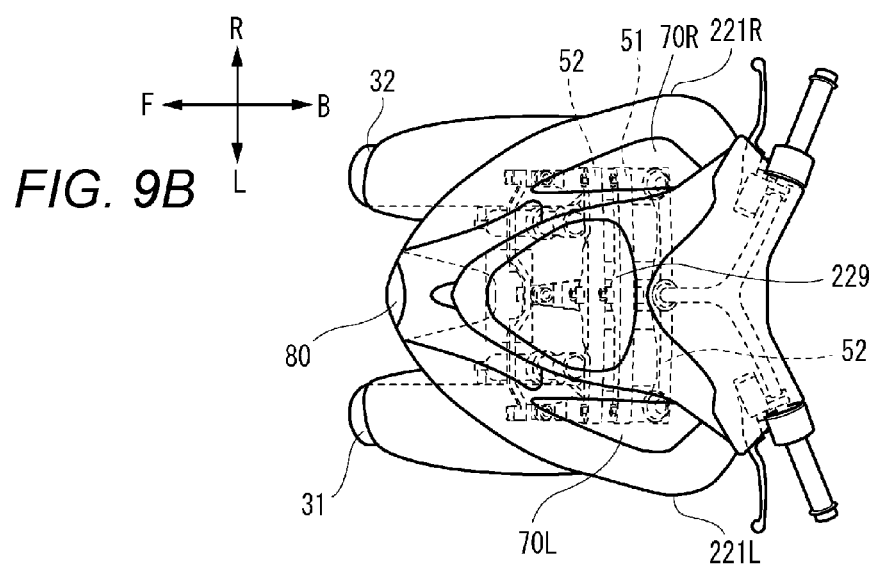

FIGS. 9A and 9B show a side view and a plan view of the vehicle 1 that includes the turn signal lamps 70L, 70R and the headlamp 80. FIG. 9A is the side view of the vehicle 1 shown in FIG. 8 as viewed from a left side thereof, and FIG. 9B is the plan view of the vehicle 1 shown in FIG. 8 as viewed from thereabove in a vertical direction. In FIGS. 8 and 9, the link mechanism 5 is shown as viewed through the body cover. In the following description, the link mechanism 5 is a mechanism that includes the upper cross portion 51, the lower cross portion 52, the left side portion 53, and the right side portion 54.

As shown in FIGS. 8 and 9, the vehicle 1 includes as lamps the headlamp 80, a positioning lamp, and the pair of left and right turn signal lamps 70L, 70R. The left turn signal lamp 70L and the right turn signal lamp 70R are aligned in the left-and-right direction of the body frame 21. In this preferred embodiment, these lamps are embedded in the front cover 221.

FIGS. 10A and 10B show schematic views illustrating a positional relationship between the link mechanism 5 and the turn signal lamps 70L, 70R. The positional relationship of the link mechanism 5 with the turn signal lamps 70L, 70R will be described in detail below.

Figure 11:
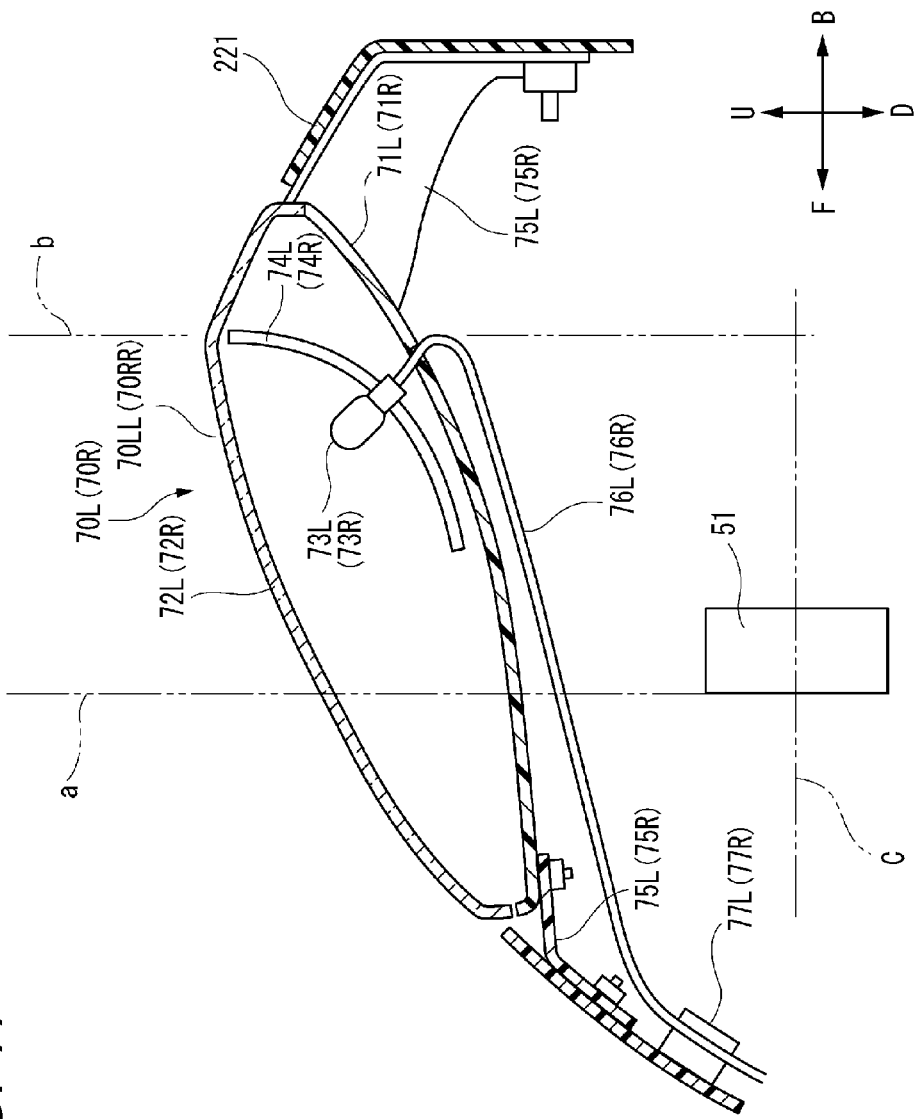
FIG. 11 is a schematic view showing a mounting structure of the left turn signal lamp.

FIG. 11 is a sectional view of the turn signal lamps 70L, 70R that is taken along a plane that intersects the left-and-right direction of the vehicle 1 at right angles. Imaginary lines a, b in FIG. 11 will be described in detail below with reference to FIGS. 10A and 10B. Since the construction of the right turn signal lamp 70R is the same as the construction of the left turn signal lamp 70L, the description of the construction of the right turn signal lamp 70R will be omitted here.

As shown in FIG. 11, the left turn signal lamp 70L includes a left housing 71L including an opening and a left outer cover 72L that covers the opening. A left light source portion 73L and a left reflector 74L (an example of a left reflecting portion) are provided in an interior of a space defined by the left housing 71L and the left outer cover 72L. A portion of the light emitted from the left light source portion 73L passes directly through the left outer cover 72L to be emitted to an exterior portion of the left turn signal lamp 70L. A portion of the other portion of light emitted from the left light source portion 73L is reflected by the left reflector 74L and then passes through the left outer cover 72L to be emitted to an exterior portion of the left turn signal lamp 70L.

As shown in FIG. 11, the left turn signal lamp 70L includes a left mounting bracket (an example of a left mounting portion) 75L that fixes the left turn signal lamp 70L to the body frame 21. This left mounting bracket 75L may be mounted on the body frame 21 or may be mounted on a member that is supported on the body frame 21. Fixing the left turn signal lamp 70L to the body frame 21 includes a case where the left turn signal lamp 70L is fixed directly to the body frame 21 and a case where the left turn signal lamp 70L is fixed indirectly to the body frame 21 via the body cover 22, a bracket that is a separate member from the body frame 21 and the like.

As shown in FIG. 11, the left turn signal lamp 70L includes a left cord (an example of a left wiring) 76L that is connected to the left light source portion 73L. The left cord 76L extends through the left housing 71L between the interior and the exterior of the left housing 71L. The left cord 76L extends to the front outside the left housing 71L and is supported at a left support portion 77L. The left support portion 77L is mounted on the body cover 22. The left support portion 77L may be mounted on the body frame 21 or a member that is supported on the body frame 21. The right turn signal lamp 70R also includes a right cord (an example of a right wiring) 76R that is connected to the right light source portion 73R.

FIGS. 10A and 10B show schematic views illustrating a positional relationship between the link mechanism 5 and the turn signal lamps 70L, 70R. FIG. 10A is a sectional view taken along a line S-S in FIGS. 9A and 9B that is a plane intersecting the upper middle axis C at right angles. In FIG. 10A, the upper middle axis C is drawn as it extends in a horizontal direction of a sheet of paper on which FIG. 10A is drawn. FIG. 10A shows a state where the upper cross portion 51 is turned counterclockwise R1 and clockwise R2 to a maximum extent relative to the body frame 21 from a condition where the body frame 21 is in the upright state in a front view of the vehicle.

In this preferred embodiment, as shown in FIG. 10A, the upper middle axis C is set at an angle at which the upper middle axis C is inclined upward at the front thereof relative to a horizontal direction HR. Additionally, the upper middle axis C extends in a direction that runs in the front-and-rear direction of the body frame 21 and that is directed more toward the front-and-rear direction than the up-and-down direction and the left-and-right direction of the body frame 21 and does not, strictly speaking, mean a direction that is directed toward the travelling direction of the vehicle 1.

The middle steering axis Y3 extends in a direction that runs in the up-and-down direction of the body frame 21 and that is directed more toward the up-and-down direction than the left-and-right direction and the front-and-rear direction of the body frame 21 and does not, strictly speaking, a vertical direction. In addition, an angle at which the middle steering axis Y3 intersects the upper middle axis C is greater than 0 degree and smaller than 180 degrees.

As shown in FIG. 10A, at least a portion of the left turn signal lamp 70L is located behind a front end portion of the link mechanism 5 that is located above the upper middle axis C in the up-and-down direction of the body frame 21 and ahead of a rear end portion of the link mechanism 5 that is located above the upper middle axis C in the up-and-down direction of the body frame 21 in the side view of the vehicle 1 in the upright state. In this preferred embodiment, the front end portion of the link mechanism 5 that is located above the upper middle axis C in the up-and-down direction of the body frame 21 is a front end portion of the upper cross portion 51. An imaginary line a passes the front end portion of the upper cross portion 51 and intersects the upper middle axis C at right angles. At least a portion of the left turn signal lamp 70L is located behind the imaginary line a.

It is noted that in this preferred embodiment, although the front end portion of the upper cross portion 51 is described as corresponding to the front end portion of the link mechanism 5, in case the upper cross portion 51 is provided only directly behind the headstock 211, a front end portion of the left side portion 53 or the right side portion 54 defines the front end portion of the link mechanism 5.

In addition, as shown in FIG. 10A, at least a portion of the left turn signal lamp 70L is located ahead of the rear end portion of the link mechanism 5 above the upper middle axis C in the up-and-down direction of the body frame 21. In this preferred embodiment, the rear end portion of the link mechanism 5 that is located above the upper middle axis C in the up-and-down direction of the body frame 21 is a rear end portion of the left side portion 53. An imaginary line b extends the rear end portion of the left side portion 53 to intersect the upper middle axis C at right angles. At least a portion of the left turn signal lamp 70L is located ahead of the imaginary line b.

It is noted that in this preferred embodiment, although the rear end portion of the left side portion 53 is described as corresponding to the rear end portion of the link mechanism 5, in case another first cross member is also provided directly behind the headstock 211, a rear end portion of the first cross member defines the rear end portion of the link mechanism 5.

In this manner, at least a portion of the left turn signal lamp 70L is located behind the imaginary line a and ahead of the imaginary line b. In this manner, in the side view of the vehicle 1 in the upright state, a portion of the left turn signal lamp 70L that is provided in an area located between the imaginary line a and the imaginary line b in relation to the upper middle axis C will be referred to as a left link side portion 70LL.

The right turn signal lamp 70R is symmetrical with the left turn signal lamp 70L in relation to the left-and-right direction of the body frame 21. The right turn signal lamp 70R also includes a right link side portion 70RR that is located ahead of the rear end portion of the link mechanism 5 above the upper middle axis C in the up-and-down direction of the body frame 21 and that is located ahead of the rear end portion of the link mechanism 5 above the upper middle axis C in the up-and-down direction of the body frame 21 in relation to the upper middle axis C in the side view of the vehicle 1 in the upright state.

Hereinafter, when the left and right turn signal lamps 70L, 70R are referred to without specifying them as left or right, they will simply be described as the turn signal lamps 70L, 70R.

A position where to dispose the left turn signal lamp 70L or particularly a position where to dispose the left link side portion LL will be described. FIG. 10B is a schematic view showing the upper cross portion 51, the left side portion 53, the right side portion 54, the headstock 211, the front cover 221, the left link side portion 70LL, and the right link side portion 70RR that result when looking at the vehicle 1 in the upright state from the front of the upper middle axis C. Additionally, in FIG. 10B, the upper cross portion 51, the left side portion 53 and the right side portion 54 are shown in broken lines when the upper cross portion 51 is turned counterclockwise R1 and clockwise R2 to a maximum extent from the state where the vehicle 1 is in the upright state relative to the body frame 21.

As shown in FIG. 10B, when looking at the vehicle 1 in the upright state from the front of the upper middle axis C, the left link side portion 70LL is located on the left of a locus along which the link mechanism 5 extends when the upper cross portion 51 turns relative to the body frame 21 in the left-and-right direction of the body frame 21.

When the upper cross portion 51 turns relative to the body frame 21, a left end portion of the upper cross portion 51 moves upward, while a right end portion of the upper cross portion 51 moves downward. In FIG. 10B, a left end portion of the locus along which the link mechanism 5 extends when the upper cross portion 51 turns relative to the body frame 21 is shown by an imaginary line c. In the left-and-right direction of the body frame 21, no member of the link mechanism 5 extends in an area located on the left of the imaginary line c. Since the left link side portion 70LL of the left turn signal lamp 70L is provided in this area, even though the link mechanism 5 operates, an interference of the left turn signal lamp 70L with the link mechanism 5 is prevented.

As shown in FIG. 10B, when looking at the vehicle 1 in the upright state from the front of the upper middle axis C, at least a portion of the left link side portion 70LL of the left turn signal lamp 70L is located on the right of a left end portion 221L of the front cover 221 (an example of the body cover) in the left-and-right direction of the body frame 21. In FIG. 10B, a vertical straight line that extends the left end portion 221L is shown as an imaginary line d.

In particular, at least a portion of the left link side portion 70LL of the left turn signal lamp 70L is located on the right of the imaginary line d in the left-and-right direction of the body frame 21. This prevents the left link side portion 70LL from extending significantly past the imaginary line d to project to the left in the left-and-right direction of the body frame 21, so that an enlargement in dimension of the vehicle 1 in its width direction is prevented.

Since the front cover 221 is fixed to the body frame 21, even though the upper cross portion 51 is turned relative to the body frame 21, the position of the left end portion 221L does not change in FIG. 10B, and the imaginary line d does not move in the same figure.

In the illustrated example, a left end portion of the left link side portion 70LL is also provided on the right of the imaginary line d in the left-and-right direction of the body frame 21. Since the whole of the left link side portion 70LL is located on the right of the imaginary line d in the left-and-right direction of the body frame 21, the vehicle 1 is prevented from being enlarged in size on the left of the link mechanism 5 in the left-and-right direction of the body frame 21.

As shown in FIG. 10B, when looking at the vehicle 1 in the upright state from the front of the upper middle axis C, at least a portion of the left link side portion 70LL of the left turn signal lamp 70L is located above the upper middle axis C in the up-and-down direction of the body frame 21. The imaginary line e denotes a horizontal line that extends through the upper middle axis C of the upper cross portion 51 in such a state that the vehicle 1 is in the upright state. The left link side portion 70LL of the left turn signal lamp 70L is provided at a high position above the imaginary line e.

As shown in FIG. 10B, when looking at the vehicle 1 in the upright state from the front of the upper middle axis C, at least a portion of the left link side portion 70LL of the left turn signal lamp 70L is provided, in relation to the up-and-down direction of the body frame 21, below the upper end portion of the link mechanism 5 that results when the upper cross portion 51 turns counterclockwise R1 to a maximum extent relative to the body frame 21. In this preferred embodiment, the upper end portion of the link mechanism 5 is an upper end portion of the left side portion 53. An imaginary line f denotes a horizontal line that extends the upper end portion of the link mechanism 5 when the upper cross portion 51 turns counterclockwise R1 to a maximum extent relative to the body frame 21. The left link side portion 70LL is prevented from extending significantly past the imaginary line f to project upward in the up-and-down direction of the body frame 21, so that the front portion of the vehicle 1 above the link mechanism 5 is prevented from being enlarged in size.

It is noted that in this preferred embodiment, although the upper end portion of the left side portion 53 is described as corresponding to the upper end portion of the link mechanism 5, in case the upper cross portion 51 projects farther upward than the upper end portion of the left side member 53 when the upper cross portion 51 turns counterclockwise R1 to a maximum extent relative to the body frame 21, the upper end portion of the upper cross portion 51 corresponds to the upper end portion of the link mechanism 5.

Next, a position where to dispose the right turn signal lamp 70R, or particularly, a position where to dispose a right turn signal lamp 70Ra will be described.

As shown in FIG. 10B, when looking at the vehicle 1 in the upright state from the front of the upper middle axis C, a right link side portion 70RR of the right turn signal lamp 70R is located on the right of a locus along which the link mechanism 5 extends when the upper cross portion 51 turns relative to the body frame 21 in relation to the left-and-right direction of the body frame 21. When the upper cross portion 51 turns relative to the body frame 21, the right end portion of the upper cross portion 51 moves upward, and the left end portion of the upper cross portion 51 moves downward. A right end portion of the locus along which the link mechanism 5 extends when the upper cross portion 51 turns relative to the body frame 21 is shown by an imaginary line g. In the left-and-right direction of the body frame 21, no member of the link mechanism 5 extends in an area located on the right of the imaginary line g. Since the right link side portion 70RR of the right turn signal lamp 70R is provided in this area, even though the link mechanism 5 is activated to operate, an interference of the right turn signal lamp 70R with the link mechanism 5 is prevented.

As shown in FIG. 10B, when looking at the vehicle 1 in the upright state from the front of the upper middle axis C, at least a portion of the right link side portion 70RR of the right turn signal lamp 70R is located on the left of the right end portion 221R in the left-and-right direction of the body frame 21. In FIG. 10B, a vertical straight line that extends the right end portion 221R is shown as an imaginary line h. In particular, at least a portion of the right link side portion 70RR is located on the right of the imaginary line h in the left-and-right direction of the body frame 21. This prevents the right link side portion 70RR from extending significantly past the imaginary line h to project to the left in the left-and-right direction of the body frame 21, so that an enlargement in dimension of the vehicle 1 in its width direction is prevented. It is noted that as with the imaginary line d, even though the body frame 21 is caused to lean, the imaginary line h does not move in FIG. 10B.

As shown in FIG. 10B, when looking at the vehicle 1 in the upright state from the front of the upper middle axis C, at least a portion of the right link side portion 70RR of the right turn signal lamp 70R is located above the upper middle axis C in the up-to-down of the body frame 21.

The right link side portion 70RR of the right turn signal lamp 70R is provided in a high position above the imaginary line e.

As shown in FIG. 10B, when looking at the vehicle 1 in the upright state from the front of the upper middle axis C, at least a portion of the right link side portion 70RR of the right turn signal lamp 70R is provided, in relation to the up-and-down direction of the body frame 21, below the upper end portion of the link mechanism 5 that results when the upper cross portion 51 turns clockwise R2 to a maximum extent relative to the body frame 21.

The position of the upper end portion of the link mechanism 5 in the up-and-down direction of the body frame 21 that results when the upper cross portion 51 turns clockwise R2 to the maximum extent relative to the body frame 21 becomes the same as the position of the upper end portion of the link mechanism 5 that results when the upper cross portion 51 turns counterclockwise R1 to the maximum extent relative to the body frame 21 in relation to the up-and-down direction of the body frame 21. In particular, in relation to the up-and-down direction of the body frame 21, the position of the upper end portion of the link mechanism 5 that results when the upper cross portion 51 turns clockwise R2 to the maximum extent relative to the body frame 21 is represented by the imaginary line f. The right link side portion 70RR of the right turn signal lamp 70R is also prevented from extending significantly past the imaginary line f to project upward, so that the front portion of the vehicle 1 is prevented from being enlarged in size.

In this manner, in the vehicle 1 according to this preferred embodiment, the left link side portion 70LL of the left turn signal lamp 70L is disposed by using effectively an area that is surrounded by the imaginary lines c, d, e and f, and the right link side portion 70RR of the right turn signal lamp 70R is disposed by using effectively an area that is surrounded by the imaginary lines g, h, e and f.

It is noted that disposing the link side portions 70LL, 70RR of the turn signal lamps 70L, 70R by using those areas does not mean only the illustrated example where the turn signal lamps 70L, 70R are disposed so that the turn signal lamps 70L, 70R are entirely provided within those areas. For example, the left turn signal lamp 70L may be disposed so that the left link side portion 70LL of the left turn signal lamp 70L straddles the imaginary line d, that is, so that a right end portion of the left link side portion 70LL is provided in an area that is surrounded by the imaginary lines c, b, c, d and a left end portion of the left link side portion 70LL is located on the left of the imaginary line d.

When the left and right turn signal lamps 70L, 70R are disposed in the manner described above, it is possible to obtain the vehicle 1 that prevents the enlargement in size of the vehicle 1 in its width direction while preventing the interference of the right lamp 70R and the left lamp 70L with the link mechanism 5. This will be described in detail below.

It is preferable that the turn signal lamps 70L, 70R are provided in positions where they do not interfere with the link mechanism 5 so as not to interrupt the operation of the link mechanism 5. The inventor has studied the configuration in which the left and right turn signal lamps 70L, 70R are disposed so as to hold the link mechanism 5 therebetween in the left-and-right direction while preventing the interference of the lamps with the link mechanism 5.

However, in case the turn signal lamps 70L, 70R are attempted to be simply disposed directly on the right and left of the link mechanism 5 so that the link mechanism 5 does not interfere with the turn signal lamps 70L, 70R, the widthwise dimension of the vehicle 1 is increased. As has been described above, when the link mechanism 5 is activated to operate, the upper cross portion 51, the lower cross portion 52, the left side portion 53, and the right side portion 54 turn about the axes that are individually parallel to the upper middle axis C. In order to prevent interference with these members when the link mechanism 5 is activated to operate, as shown in FIG. 9B, the vehicle's external parts including the front cover 221 and the turn signal lamps 70L, 70R are provided in positions that are spaced apart leftward and rightward from the link mechanism 5, and in the vehicle's external parts those that are provided directly on the right and left of the link mechanism 5 tend to be enlarged in size. In particular, in case the turn signal lamps 70L, 70R are disposed at those portions located directly on the right and left of the link mechanism 5 that originally tend to be enlarged in size, there are concerns that the widthwise dimension of the vehicle 1 is increased further.

However, as a result of studying the operation of the link mechanism 5, the inventors discovered that the link mechanism 5 does not extend into the area that is surrounded by the imaginary lines c, d, e, f and the area that is surrounded by the imaginary lines g, h, e, f when looking at the vehicle 1 from the front of the upper middle axis C.

At a glance, in order to prevent the interference of the lamps with the link mechanism 5, in the vehicle 1 in the upright state, it seems to be necessary that the lamps are disposed on the left of the left end portion of the link mechanism 5 (in FIG. 10B, on the left of a point of intersection between the imaginary lines c and e) and on the right of the right end portion of the link mechanism 5 (in FIG. 10B, on the right of a point of intersection between the imaginary lines g and e) in relation to the left-and-right direction of the body frame 21. However, the inventors have studied the possibility of preventing the enlargement in size of the vehicle in its width direction by disposing the lamps closer to the center of the vehicle than those positions.

In FIG. 10B, as has been described above, the imaginary line c represents the left end portion of the locus of the link mechanism 5 when the link mechanism 5 operates. As shown by the imaginary line c, when the upper cross portion 51 turns counterclockwise R1 relative to the body frame 21 from the upright state of the vehicle 1, the left end portion of the link mechanism 5 moves inward in the vehicle's width direction above the upper middle axis C (above the imaginary line e) in the up-and-down direction of the body frame 21.

Additionally, in FIG. 10B, as has been described above, the imaginary line g represents the right end portion of the locus of the link mechanism 5 when the link mechanism 5 operates. As shown by the imaginary line g, when the upper cross portion 51 turns clockwise R2 relative to the body frame 21 from the upright state of the vehicle 1, the right end portion of the link mechanism 5 moves inward in the vehicle's width direction above the upper middle axis C (above the imaginary line e) in the up-and-down direction of the body frame 21.

The inventors discovered that the link mechanism 5 does not extend into the area located directly on the left of the imaginary line c in the left-and-right direction of the body frame 21 and directly above the imaginary line e in the up-and-down direction of the body frame 21. In particular, when looking at the vehicle 1 in the upright state from the front of the upper middle axis C, the dimension of the locus along which the link mechanism 5 extends when the upper cross portion 51 turns relative to the body frame 21 in the left-and-right direction reduces as the locus extends upward farther than the upper middle axis C in the up-and-down direction of the body frame 21. In other words, the distance between the imaginary line d and the imaginary line c in the left-and-right direction increases as the locus extends upward. Then, the inventors discovered that by using the characteristics of the link mechanism 5, the left link side portion 70LL of the left turn signal lamp 70L is disposed in the space located directly on the left of the imaginary line c in the left-and-right direction of the body frame 21 and directly above the imaginary line e in the up-and-down direction of the body frame 21. Additionally, the inventors discovered that the right link side portion 70RR of the right turn signal lamp 70R is disposed in the space located directly on the right of the imaginary line g in the left-and-right direction of the body frame 21 and directly above the imaginary line e in the up-and-down direction of the body frame 21.

The imaginary line c that is located above the imaginary line e in the up-and-down direction of the body frame 21 extends farther to the right in the left-and-right direction of the body frame 21 than a vertical axis that extends through a point of intersection between the imaginary line c and the imaginary line e. In particular, compared with a case where the left link side portion 70LL is disposed on the left of the vertical axis that extends through the point of intersection between the imaginary line c and the imaginary line e in the left-and-right direction of the body frame 21, in case the left link side portion 70LL is disposed in the space located above the imaginary line e in the up-and-down direction of the body frame 21 and on the left of the imaginary line c in the left-and-right direction of the body frame 21, the left turn signal lamp 70L is disposed farther rightward in relation to the left-and-right direction of the body frame 21.

Similarly, the imaginary line g that is located above the imaginary line e in the up-and-down direction of the body frame 21 extends farther to the left in the left-and-right direction of the body frame 21 than a vertical axis that extends through a point of intersection between the imaginary line g and the imaginary line e. In particular, compared with a case where the right link side portion 70RR is disposed on the right of the vertical axis that extends through the point of intersection between the imaginary line g and the imaginary line e in the left-and-right direction of the body frame 21, in case the right link side portion 70RR is disposed in the space located above the imaginary line e in the up-and-down direction of the body frame 21 and on the right of the imaginary line g in the left-and-right direction of the body frame 21, the right turn signal lamp 70R is disposed farther leftward in relation to the left-and-right direction of the body frame 21.

In this manner, even though at least the link side portions 70LL, 70RR of the turn signal lamps 70L, 70R are disposed on the left and right of the link mechanism 5 in relation to the left-and-right direction of the body frame 21, it is possible to prevent the enlargement in dimension of the vehicle 1 in its width direction. In particular, the turn signal lamps 70L, 70R are disposed in positions located closer to the link mechanism 5 to such an extent that the turn signal lamps 70L, 70R do not interfere with the link mechanism 5 in relation to the left-and-right direction of the body frame 21. This prevents the enlargement in size of the vehicle 1 in its width direction while preventing the interference of the right lamp 70R and the left lamp 70L with the link mechanism 5.

In addition, even though the link side portions 70LL, 70RR of the turn signal lamps 70L, 70R are disposed above the imaginary line e, the enlargement in size of the vehicle 1 in its width direction is prevented while preventing the interference of the right lamp 70R and the left lamp 70L with the link mechanism 5.

In case at least the left link side portion 70LL of the left turn signal lamp 70L and the right link side portion 70RR of the right turn signal lamp 70R are disposed within the areas that are defined by the imaginary lines a to h, it is possible to provide the vehicle 1 that prevents the enlargement in size of the vehicle 1 in its width direction while preventing the interference of the right lamp 70R and the left lamp 70L with the link mechanism 5.

In particular, in relation to the upper middle axis C, in the turn signal lamps 70L, 70R, a portion located ahead of the imaginary line a or a portion located directly behind the imaginary line b may be provided outside the areas that are defined by the imaginary lines a to h when looking at the vehicle 1 from the front of the upper middle axis C. In the turn signal lamps 70L, 70R, the portion located ahead of the imaginary line a or the portion located directly behind the imaginary line b is provided directly ahead of the front end portion or directly behind the rear end portion of the link mechanism 5 in relation to the upper middle axis C. Because of this, the portions of the turn signal lamps 70L, 70R that are located ahead of the imaginary line a or the portions that are located behind the imaginary line b do not interfere with the link mechanism 5. Because of this, the portions of the turn signal lamps 70L, 70R that are located ahead of the imaginary line a or the portions that are located behind the imaginary line b may be provided so as to overlap the link mechanism 5 when looking at the vehicle 1 from the front of the upper middle axis C. Because of this, in relation to the upper middle axis C, the portions of the turn signal lamps 70L, 70R that are located ahead of the imaginary line a or the portion that is located behind the imaginary line b may be provided in arbitrary areas.

In the vehicle 1 according to this preferred embodiment, as shown in FIG. 8, in the front view of the vehicle 1 in the upright state, a headlamp 80, which is an example of a middle lamp, is provided between the right lamp 70R and the left lamp 70L in the left-and-right direction of the body frame 21.

As shown in FIGS. 9A and 9B, at least a portion of the headlamp 80 is located below the right lamp 70R and the left lamp 70L in the up-and-down direction of the body frame 21 and is located ahead of the link mechanism 5 in relation to the direction of the upper middle axis C.

The right lamp 70R and the left lamp 70L are disposed on the right and the left of the loci along which the link mechanism 5 extends in the left-and-right direction of the body frame 21, respectively, in the front view of the vehicle 1 in the upright state. This enhances the degree of freedom in designing the space directly ahead of the link mechanism 5 in the front-and-rear direction of the body frame 21. Additionally, the space directly ahead of the link mechanism 5 defines a space where the upper cross portion 51, the lower cross portion 52, the left side portion 53, and the right side portion 54 do not extend even in the event that the link mechanism 5 is activated to operate. In particular, even though the middle lamp 80 such as the headlamp is disposed in the space directly ahead of the link mechanism 5, it is possible to prevent the interference of the middle lamp 80 with the link mechanism 5.

Moreover, in case at least a portion of the middle lamp 80 is disposed below the right lamp 70R and the left lamp 70L in the up-and-down direction of the body frame 21, the right lamp 70R, the middle lamp 80, and the left lamp 70L are prevented from being aligned on a straight line but are disposed in an inverted triangle in the front view of the vehicle 1 in the upright state. Because of this, the middle lamp 80, the left lamp 70L, the right lamp 70R, and the middle lamp 80 are not aligned in the same position in relation to the up-and-down direction of the body frame 21, and therefore, the dimension of the vehicle 1 does not have to be increased in the left-and-right direction of the body frame 21. Consequently, the enlargement in size of the vehicle 1 in its width direction is prevented while preventing the interference of the right lamp 70R and the left lamp 70L with the link mechanism 5. Additionally, a space between the right lamp 70R and the middle lamp 80 and a space between the left lamp 70L and the middle lamp 80 are increased.

In addition, according to the vehicle 1 of this preferred embodiment, as shown in FIGS. 10A and 10B, the body cover 22 includes a right opening portion 221Ra and a left opening portion 221La.

A portion of the right link side portion 70RR is located inward of the right opening portion 221Ra of the body cover 22 and the other portion is located outward of the right opening portion 221Ra of the body cover 22.

A portion of the left link side portion 70LL is located inward of the left opening portion 221La of the body cover 22 and the other portion is located outward of the left opening portion 221La of the body cover 22.

The space is located inward of the body cover 22 and between the body cover 22 and the link mechanism 5 to prevent the interference of the body cover 22 with the link mechanism 5. According to the vehicle 1 of this preferred embodiment, the left lamp 70L and the right lamp 70R are disposed by using the characteristics of the link mechanism 5 and also the space provided inward of the body cover 22 and the between the body cover 22 and the link mechanism 5. Consequently, the enlargement in size of the vehicle 1 in its width direction is prevented while preventing the interference of the right lamp 70R and the left lamp 70L with the link mechanism 5.

In addition, according to the vehicle 1 of this preferred embodiment, as shown in FIG. 11, the right link side portion 70RR is located outward of the right opening portion 221Ra in the body cover 22 and includes at least a portion of the right outer cover 72R that transmits light from a right light source portion 73R.

The left link side portion 70LL is located outward of the left opening portion 221La in the body cover 22 and includes at least a portion of the left outer cover 72L that transmits light from a left light source portion 73L.

The right link side portion 70RR includes at least a portion of the right outer cover 72R that defines a light emitting surface, and the left link side portion 70LL includes at least a portion of the left outer cover 72L that defines a light emitting surface. Because of this, even though the light emitting surfaces are disposed in high positions, the enlargement in size of the vehicle 1 in its width direction is prevented while preventing the interference of the right lamp 70R and the left lamp 70L with the link mechanism 5.

In addition, according to the vehicle 1 of this preferred embodiment, as shown in FIG. 11, the right lamp 70R includes the right outer cover 72R that transmits light from the right light source portion 73R. A front end portion of the right outer cover 72R is located ahead of the front end portion of the link mechanism 5 that is located above the upper middle axis C in the up-and-down direction of the body frame 21 (ahead of the imaginary line a) in relation to the direction of the upper middle axis C.

The left lamp 70L includes the left outer cover 72L that transmits light from the left light source portion 73L. A front end portion of the left outer cover 72L is located ahead of the front end portion of the link mechanism 5 that is located above the upper middle axis C in the up-and-down direction of the body frame 21 (ahead of the imaginary line a) in relation to the direction of the upper middle axis C.

The right lamp 70R and the left lamp 70L are disposed on the right and the left of the loci along which the link mechanism 5 extends in the left-and-right direction of the body frame 21, respectively, in the front view of the vehicle 1 in the upright state. In particular, since the left lamp 70L and the right lamp 70R are disposed in the left-and-right direction of the body frame 21 in the link mechanism 5, the degree of freedom in designing the space directly ahead of the link mechanism 5 is enhanced. Additionally, the space directly ahead of the link mechanism 5 defines the space where the constituent members of the link mechanism 5 do not extend even though the link mechanism 5 is activated to operate. According to the vehicle 1 of this preferred embodiment, by using a portion of the space directly ahead of the link mechanism 5 that provides the high degree of freedom in design and that facilitates preventing interference of the lamps with the link mechanism 5, the sizes of the left link side portion 70LL and the right link side portion 70RR are prevented from being increased while preventing the interference with the link mechanism 5. Moreover, the right lamp 70R and the left lamp 70L are preferably elongated in shape along the upper middle axis C. Consequently, the enlargement in size of the vehicle 1 in its width direction is prevented while preventing the interference of the right lamp 70R and the left lamp 70L with the link mechanism 5.

In addition, according to the vehicle 1 of this preferred embodiment, as shown in FIG. 11, the right link side portion 70RR of the right lamp 70R includes at least a portion of the right light source portion 73R. The left link side portion 70LL of the left lamp 70L includes at least a portion of the left light source portion 73L.

The left and right light source portions 73L, 73R that emit light are disposed in high positions on the vehicle. Additionally, the right light source portion 73R and the left light source 73L are disposed in positions that are spaced apart from each other in the left-and-right direction of the body frame 21. Consequently, even though the light source portions 3L, 73R are disposed in high positions, the enlargement in size of the vehicle 1 in its width direction is prevented while preventing the interference of the right lamp 70R and the left lamp 70L with the link mechanism 5.

In addition, according to the vehicle 1 of this preferred embodiment, as shown in FIG. 11, the right lamp 70R includes a right reflecting portion 74R that reflects light. The right link side portion 70RR includes at least a portion of the right reflecting portion 74R.

The left lamp 70L includes a left reflecting portion 74L that reflects light. The left link side portion 70LL includes at least a portion of the left reflecting portion 74L.

The left and right light reflecting portions 74L, 74R that emit light are disposed in high positions on the vehicle. Additionally, the right reflecting portion 74R and the left reflecting portion 74L are disposed in positions that are spaced apart from each other in the left-and-right direction of the body frame 21. Consequently, even though the reflecting portions 74L, 74R are disposed in high positions, the enlargement in size of the vehicle 1 in its width direction is prevented while preventing the interference of the right lamp 70R and the left lamp 70L with the link mechanism 5.

Additionally, according to the vehicle 1 of this preferred embodiment, the right lamp 70R includes a right mounting portion 75R where the right lamp 70R is fixed to the body frame 21. At least a portion of the right mounting portion 75R is located ahead of a front end portion of the link mechanism 5 that is located above the upper middle axis C in the up-and-down direction of the body frame 21 and behind a rear end portion of the link mechanism 5 that is located above the upper middle axis C in the up-and-down direction of the body frame 21 in relation to the direction of the upper middle axis C.

The left lamp 70L includes a left mounting portion 75L where the left lamp 70L is fixed to the body frame 21. At least a portion of the left mounting portion 75L is located ahead of a front end portion of the link mechanism 5 that is located above the upper middle axis C in the up-and-down direction of the body frame 21 and behind a rear end portion of the link mechanism 5 that is located above the upper middle axis C in the up-and-down direction of the body frame 21 in relation to the direction of the upper middle axis C.

Rigidity is required on the mounting portions 75R, 75L which support the lamps on the body frame 21, which tends to increase the size of the mounting portions 75R, 75L. According to the vehicle 1 of this preferred embodiment, the left and right mounting portions 75L, 75R are provided by using the space defined directly ahead or behind the link mechanism 5 that provides a high degree of freedom in design and that does not interfere with the link mechanism 5, so that the left lamp 70L and the right lamp 70R are mounted on the vehicle 1 while preventing the interference with the link mechanism 5 and preventing the enlargement in size of the vehicle 1 in its width direction. Compared with a case where the left and right mounting portions 75L, 75R are provided on the left link side portion 70LL and the right link side portion 70RR, respectively, the enlargement in size of the vehicle 1 in its width direction is prevented further. It is noted that fixing the lamps to the body frame 21 includes a case where the lamps are fixed directly to the body frame 21 and also a case where the lamps are fixed indirectly to the body frame 21 via the body cover 22, brackets and the like.

In addition, according to the vehicle 1 of this preferred embodiment, the right lamp 70R includes a right wiring 76R that is connected to the right light source 73R, and the right wiring 76R is fixed to the body frame 21 ahead of a front end portion of the link mechanism 5 that is located above the upper middle axis C in the up-and-down direction of the body frame 21 or behind a rear end portion of the link mechanism 5 that is located above the upper middle axis C in the up-and-down direction of the body frame 21 in relation to the direction of the upper middle axis C.

The left lamp 70L includes a left wiring 76L that is connected to the left light source 73L, and the left wiring 76L is fixed to the body frame 21 ahead of a front end portion of the link mechanism 5 that is located above the upper middle axis C in the up-and-down direction of the body frame 21 or behind a rear end portion of the link mechanism 5 that is located above the upper middle axis C in the up-and-down direction of the body frame 21 in relation to the direction of the upper middle axis C.

According to the vehicle 1 of this preferred embodiment, the right wiring 76R and the left wiring 76L are fixed to the body frame 21 in such a state that the right wiring 76R and the left wiring 76L extend forward or rearward. Because of this, the right wiring 76R and the left wiring 76L is prevented from interfering with the link mechanism 5. In addition, it is prevented that the right wiring 76R is fixed to the right link side portion 70RR or that the left wiring 76L is fixed to the left link side portion 70LL. Consequently, the enlargement in size of the vehicle 1 in its width direction is prevented while preventing the interference of the right lamp 70R and the left lamp 70L with the link mechanism 5. It is noted that fixing the lamps to the body frame 21 includes a case where the lamps are fixed directly to the body frame 21 and also a case where the lamps are fixed indirectly to the body frame 21 via the body cover 22, brackets and the like. In addition, a case is also included where the left and right wirings 76L, 76R are fixed to the left lamp 70L and the right lamp 70R, respectively.

In the preferred embodiments that have been described heretofore, the turn signal lamps 70L, 70R are described as being embedded in the body cover 22. As shown as a modified example in FIGS. 12A, 12B, and 13, turn signal lamps 70La, 70Ra may be fixed to the body cover 22 via corresponding stays 78L, 78R which define a portion of the turn signal lamps 70La, 70Ra, respectively.

Figures 12A, 12B:
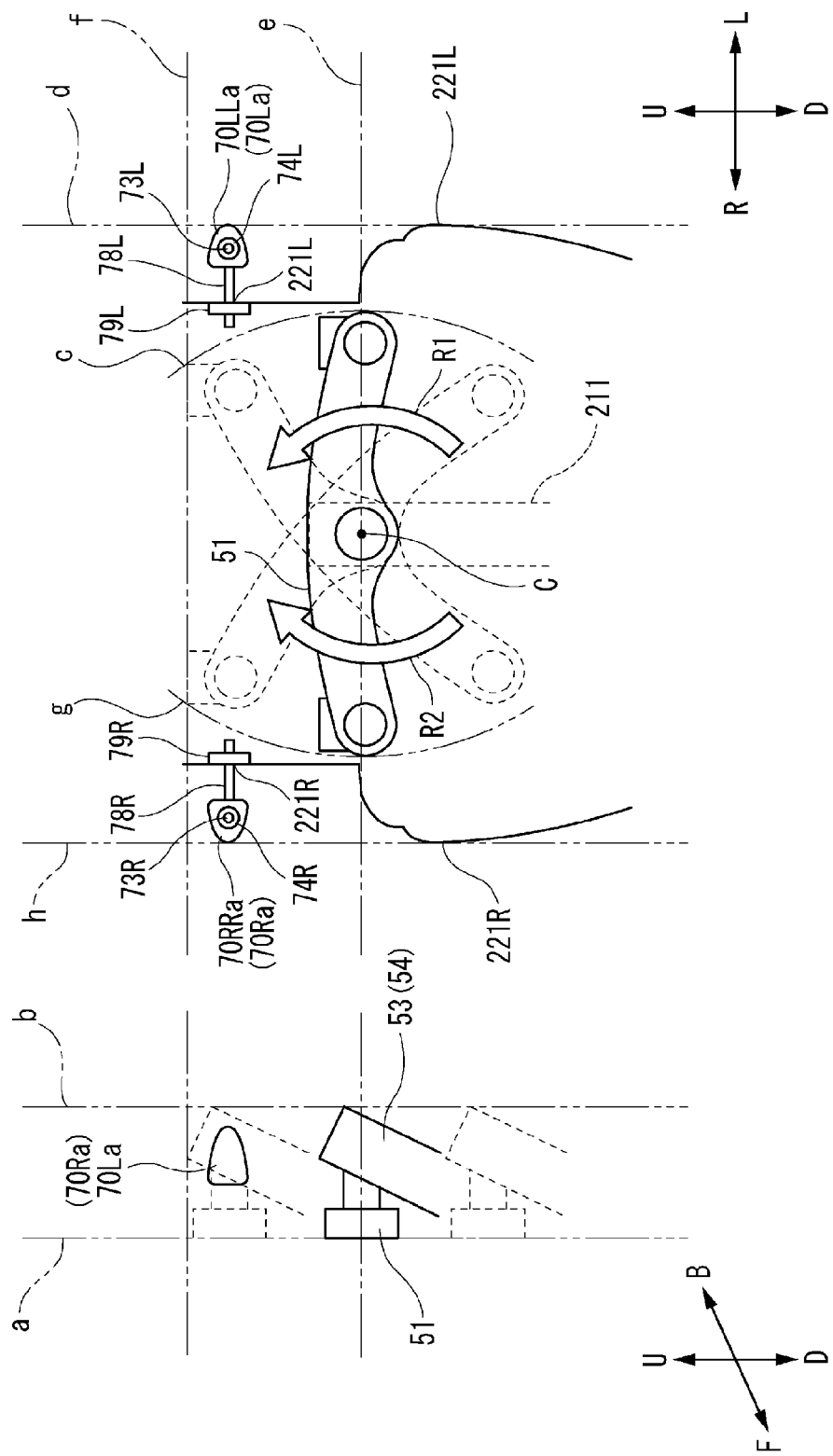
FIGS. 12A and 12B show views similar to those shown in FIGS. 10A and 10B which show a vehicle according to a modified example of a preferred embodiment of the present invention.
Figure 13:
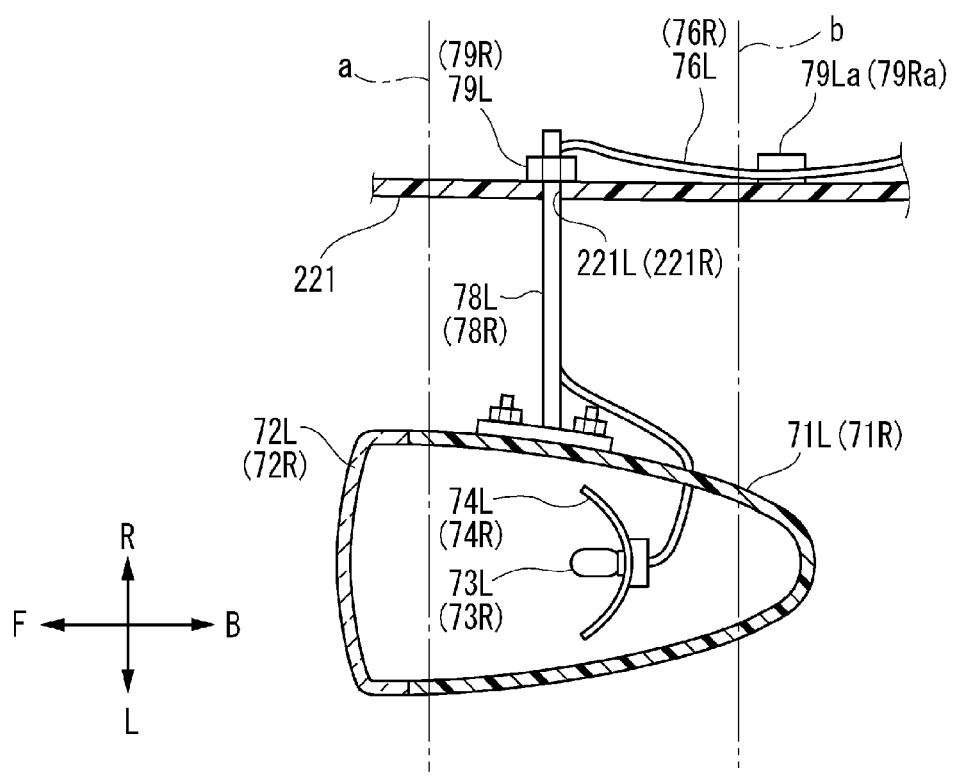
FIG. 13 is a view showing a mounting structure of a left turn signal lamp.

FIGS. 12A and 12B are views of a vehicle 1 according to the modified example, which are similar to those shown in FIGS. 10A and 10B. In FIGS. 12A and 12B, imaginary lines a to h are similar to those shown in FIGS. 10A and 10B. FIG. 13 is a view showing a mounting structure of the left turn signal lamp 70La. FIG. 13 is a plan view of the left turn signal lamp 70La and a horizontal cross section of a front cover 221 from thereabove. Like reference numerals will be given to like members to those of the preferred embodiments described above, and the description thereof will be omitted here.

As shown in FIGS. 12A, 12B, and 13, one end of the left stay 78L (an example of a left mounting portion) penetrates an opening 221L that is provided in the front cover 221 of a body cover 22. The one end of the left stay 78L is fixed to the front cover 221 by a left grommet 79L that is located inward of the front cover 221. The other end of the left stay 78L is fixed to a left housing 71L of the left turn signal lamp 70La.

As shown in FIGS. 12A, 12B, and 13, one end of the right stay 78R (an example of a right mounting portion) penetrates an opening 221R that is provided in the front cover 221 of the body cover 22. The one end of the right stay 78R is fixed to the front cover 221 by a right grommet 79R that is located inward of the front cover 221. The other end of the right stay 78R is fixed to a right housing 71R of the right turn signal lamp 70Ra.

Fixing the left and right turn signal lamps 70La, 70Ra to the body frame 21 includes a case where the left and right turn signal lamps 70La, 70Ra are fixed directly to the body frame 21 and a case where the left and right turn signal lamps 70La, 70Ra are fixed indirectly to the body frame 21 via separate members from the body cover 22 and the body frame 21 such as brackets.

The left turn signal lamp 70La includes a left housing 71L that accommodates at least a portion of a left light source portion 73L. At least a portion of the left housing 71L of the left turn signal lamp 70La is located outward of the front cover (an example of a body cover) 221.

Additionally, the right turn signal lamp 70Ra includes a right housing 71R that accommodates at least a portion of a right source portion 73R. At least a portion of the right housing 71R of the right turn signal lamp 70Ra is located outward of the front cover (an example of the body cover) 221.

A space defined in the left-and-right direction between the left and right turn signal lamps 70La, 70Ra is easily expanded without increasing a dimension of the front cover 221 in the vehicle's width direction by providing the left stay 78L and the right stay 78R so as to project in the left-and-right direction of the vehicle 1. Because of this, even though the turn signal lamps 70La, 70Ra are spaced apart from each other in the left-and-right direction, the enlargement in size of the vehicle 1 in its width direction is prevented while preventing the interference of the right lamp 70Ra and the left lamp 70La with a link mechanism 5.

In this case, too, as shown in FIG. 12A, at least portions of the left and right turn signal lamps 70La, 70Ra are provided behind a front end portion of the link mechanism 5 that is located above the upper middle axis C in the up-and-down direction of the body frame 21 and ahead of a rear end portion of the link mechanism 5 that is located above the upper middle axis C in the up-and-down direction of the body frame 21 in relation to the upper middle axis C in the side view of the vehicle 1 in the upright state. In particular, the left turn signal lam 70La includes a left link side portion 70LLa behind the imaginary line a and ahead of the imaginary line b, and the right turn signal lamp 70Ra includes a right link side portion 70RRa behind the imaginary line a and ahead of the imaginary line b.

As shown in FIG. 12A, when looking at the vehicle 1 in the upright state from the front of the upper middle axis C, the left link side portion 70LLa is located on the left of a locus along which the link mechanism 5 extends when an upper cross portion 51 turns relative to the body frame 21 in the left-and-right direction of the body frame 21. In particular, the left link side portion 70LLa is provided directly on the left of the imaginary line c.

Additionally, when looking at the vehicle 1 in the upright state from the front of the upper middle axis C, at least a portion of the left link side portion 70LLa is located on the right of a left end portion 221L of the front cover 221 (an example of the body cover) in the left-and-right direction of the body frame 21. At least a portion of the left link side portion 70LLa is located above the upper middle axis in the up-and-down direction of the body frame 21. In relation to the up-and-down direction of the body frame 21, at least a portion of the left link side portion 70LLa is located below an upper end portion of the link mechanism 5 that results when the upper cross portion 51 turns counterclockwise R1 to a maximum extent relative to the body frame 21 in the up-and-down direction of the body frame 21. In particular, at least a portion of the left link side portion 70LLa is provided directly on the right of the imaginary line d, above the imaginary line e and below the imaginary line f.

Additionally, as shown in FIG. 12A, when looking at the vehicle 1 in the upright state from the front of the upper middle axis C, the right link side portion 70RRa is located on the right of a locus along which the link mechanism 5 extends when the upper cross portion 51 turns relative to the body frame 21 in the left-and-right direction of the body frame 21. In particular, the right link side portion 70RRa is provided directly on the right of the imaginary line g.

When looking at the vehicle 1 in the upright state from the front of the upper middle axis C, at least a portion of the right link side portion 70RRa is disposed on the left of a right end portion 221R of the front cover 221 (an example of the body cover) in the left-and-right direction of the body frame 21, is disposed above the upper middle axis C in the up-and-down direction of the body frame 21 and is disposed below an upper end portion of the link mechanism 5 that results when the upper cross portion 51 turns counterclockwise R1 to a maximum extent relative to the body frame 21 in relation to the up-and-down direction of the body frame 21. In particular, at least a portion of the right turn signal lamp 70Ra is provided directly on the right of the imaginary line h, above the imaginary line e and below the imaginary line f.

According to the configuration described above, the turn signal lamps 70La, 70Ra are disposed directly on the left and on the right of the link mechanism 5, respectively in relation to the left-and-right direction of the body frame 21, so that the enlargement in size of the vehicle 1 in its width direction is prevented while preventing the interference of the turn signal lamps 70La, 70Ra with the link mechanism 5.

In particular, in this modified example, the enlargement in dimension of the front cover 221 in its width direction is prevented by disposing roots of the left stay 78L and the right stay 78R of the turn signal lamps 70La, 70Ra that are disposed inside the front cover 221 as close to the link mechanism 5 as possible. Additionally, the distance at which the left and right turn signal lamps 70La, 70Ra are separated from each other in the left-and-right direction is increased by disposing the left and right turn signal lamps 70La, 70Ra in positions that are spaced apart in the left-and-right direction from the front cover 221 by the left and right stays 78L, 78R. Even though the vehicle 1 is configured in the manner described above, the enlargement in size of the vehicle 1 in its width direction is prevented while preventing the interference of the right lamp 70Ra and the left lamp 70La with the link mechanism 5.

In addition, even though the turn signal lamps 70La, 70Ra are disposed above the imaginary line e, the interference of the right lamp 70Ra and the left lamp 70La with the link mechanism 5 is prevented, and the enlargement in size of the vehicle 1 in its width direction is prevented.

In this modified example, too, as shown in FIG. 13, the right lamp 70Ra includes a right outer cover 72R that transmits light from a right light source portion 73R. A front end portion of the right outer cover 72R is located ahead of the front end portion of the link mechanism 5 that is located above the upper middle axis C in the up-and-down direction of the body frame 21 (ahead of the imaginary line a) in relation to the direction of the upper middle axis C.

The left lamp 70La includes a left outer cover 72L that transmits light from a left light source portion 73L. A front end portion of the left outer cover 72L is located ahead of the front end portion of the link mechanism 5 that is located above the upper middle axis C in the up-and-down direction of the body frame 21 in relation to the direction of the upper middle axis C.

The right lamp 70Ra and the left lamp 70La are disposed directly on the right and the left of the loci along which the link mechanism 5 extends in the left-and-right direction of the body frame 21, respectively, in the front view of the vehicle 1 in the upright state. In particular, since the left lamp 70La and the right lamp 70Ra are disposed directly on the left and the right of the link mechanism 5 in the left-and-right direction of the body frame 21, respectively, the degree of freedom in designing the space directly ahead of the link mechanism 5 is enhanced. Additionally, as has been described above, the space directly ahead of the link mechanism 5 is easily prevented from the interfering with the link mechanism 5. According to the vehicle 1 of this preferred embodiment, by disposing the left turn signal lamp 70La and the right turn signal lamp 70Ra by using a portion of the space defined directly ahead of the link mechanism 5 that provides a high degree of freedom in design and that facilitates preventing interference of the lamps with the link mechanism 5, the sizes of the left link side portion 70LLa and the right link side portion 70RRa is prevented. Moreover, the right lamp 70Ra and the left lamp 70La are preferably elongated in shape along the upper middle axis C. Consequently, the enlargement in size of the vehicle 1 in its width direction is prevented while preventing the interference of the right lamp 70R and the left lamp 70L with the link mechanism 5.

In this modified example, too, as shown in FIG. 13, the right link side portion 70RRa of the right lamp 70Ra includes at least a portion of the right light source portion 73R.

The left link side portion 70LLa of the left lamp 70La includes at least a portion of the left light source portion 73L.

The left and right light source portions 73L, 73R that emit light are disposed in high positions on the vehicle. Additionally, the right light source portion 73R and the left light source 73L are disposed in positions that are spaced apart from each other in the left-and-right direction of the body frame 21. Consequently, even though the light source portions 73R, 73L are disposed in positions on the vehicle that are located high and spaced apart from each other in the left-and-right direction, the enlargement in size of the vehicle 1 in its width direction is prevented while preventing the interference of the right lamp 70R and the left lamp 70L with the link mechanism 5.

In this modified example, too, as shown in FIG. 13, the right lamp 70Ra includes a right reflecting portion 74R that reflects light. The right link side portion 70RRa includes at least a portion of the right reflecting portion 74R.

The left lamp 70La includes a left reflecting portion 74L that reflects light. The left link side portion 70LLa includes at least a portion of the left reflecting portion 74L.

The left and right reflecting portions 74L, 74R that reflect light are disposed in high positions on the vehicle. Additionally, the right reflecting portion 74R and the left reflecting portion 74L are disposed in positions that are spaced apart from each other in the left-and-right direction of the body frame 21. Consequently, even though the reflecting portions 74R, 74L are disposed in positions on the vehicle that are located high and spaced apart from each other in the left-and-right direction, the enlargement in size of the vehicle 1 in its width direction is prevented while preventing the interference of the right lamp 70R and the left lamp 70L with the link mechanism 5.

In this modified example, as shown in FIGS. 12A and 12B, the body cover 22 includes a right opening portion 221Ra and a left opening portion 221La.

The right link side portion 70RRa includes a right housing 71R that accommodates at least a portion of the right light source portion 73R. At least a portion of the right housing 71R is located outward of the right opening portion 221Ra.

The left link side portion 70LLa includes a left housing 71L that accommodates at least a portion of the left light source 73L. At least a portion of the left housing 71L is located outward of the left opening portion 221La.

Since at least a portion of the right housing 71R is located outward of the right opening portion 221Ra and at least a portion of the left housing 71L is located outward of the left opening portion 221La, the body cover 22 is compact. In addition, since the left and right housings 71L, 71R are provided outward of the body cover 22, it is easier to prevent the interference with the link mechanism 5 that is located inward of the body cover 22. Because of this, the enlargement in size of the vehicle 1 in its width direction is prevented while preventing the interference of the right lamp 70R and the left lamp 70L with the link mechanism 5.

In this modified example, as shown in FIG. 13, the right lamp 70Ra includes a right mounting portion 78R where the right lamp 70Ra is fixed to the body frame 21, and the right link side portion 70RRa includes at least a portion of the right mounting portion 78R.

The left lamp 70La includes a left mounting portion 78L where the left lamp 70La is fixed to the body frame 21, and the left link side portion 70LLa includes at least a portion of the left mounting portion 78L.

Rigidity is required on a mounting portion which supports a lamp on the body frame 21, which tends to increase the size of the mounting portion. According to the vehicle 1 of this preferred embodiment, the left lamp 70L and the right lamp 70Ra are mounted on the vehicle 1 while preventing the enlargement in the size of the vehicle 1 in its width direction by using the spaces defined directly on the right and left of the link mechanism 5. Even though the left and right mounting portions 78L, 78R are provided at the left link side portion 70LLa and the right link side portion 70RRa, compared with a case where the left and right mounting portions 78L, 78R are provided at the left link side portion 70LLa and the right link side portion 70RRa without using the spaces directly on the right and left of the link mechanism 5, the enlargement in size of the vehicle 1 in its width direction is prevented. Consequently, the enlargement in size of the vehicle 1 in its width direction is prevented while preventing the interference of the right lamp 70R and the left lamp 70L with the link mechanism 5. It is noted that fixing the lamps to the body frame 21 includes a case where the lamps are fixed directly to the body frame 21 and also a case where the lamps are fixed indirectly to the body frame 21 via the body cover 22, brackets and the like.

In this modified example, as shown in FIG. 13, the right lamp 70Ra includes a right wiring 76R that is connected to the right light source portion 73R. The right wiring 76R is fixed to the body frame 21 ahead of a front end portion of the link mechanism 5 that is located above the upper middle axis C in the up-and-down direction of the body frame 21 or behind a rear end portion of the link mechanism 5 that is located above the upper middle axis C in the up-and-down direction of the body frame 21 in relation to the direction of the upper middle axis C.

The left lamp 70La includes a left wiring 76L that is connected to the left light source portion 73L. The left wiring 76L is fixed to the body frame 21 ahead of the front end portion of the link mechanism 5 that is located above the upper middle axis C in the up-and-down direction of the body frame 21 or behind the rear end portion of the link mechanism 5 that is located above the upper middle axis C in the up-and-down direction of the body frame 21 in relation to the direction of the upper middle axis C.

According to the vehicle 1 of this preferred embodiment, the right wiring 76R and the left wiring 76L are fixed to the body frame 21 in such a state that the right wiring 76R and the left wiring 76L extend forward or rearward. Because of this, the right wiring 76R and the left wiring 76L are prevented from interfering with the link mechanism 5. In addition, it is prevented that the right wiring 76R is fixed to the right link side portion 70RRa or that the left wiring 76L is fixed to the left link side portion 70LLa. Consequently, an increase in size of the vehicle 1 in its width direction is prevented while preventing the interference of the right lamp 70Ra and the left lamp 70La with the link mechanism 5. It is noted that fixing the lamps to the body frame 21 includes a case where the lamps are fixed directly to the body frame 21 and also a case where the lamps are fixed indirectly to the body frame 21 via the body cover 22, brackets and the like. In addition, a case is also included where the left and right wirings 76L, 76R are fixed to the left lamp 70La and the right lamp 70Ra, respectively.

Additionally, in this modified example, too, when looking at the vehicle 1 in the upright state from the front of the upper middle axis C, a right end portion of the right link side portion 70RRa of the right lamp 70Ra is located on the left of the right end portion 221R of the body cover 22 in the left-and-right direction of the body frame 21.

When looking at the vehicle 1 in the upright state from the front of the upper middle axis C, a left end portion of the left link side portion 70LLa of the left lamp 70La is located on the right of the left end portion 221L of the body cover 22 in the left-and-right direction of the body frame 21.

According to the vehicle 1 of this preferred embodiment, in relation to the left-and-right direction of the body frame 21, the whole of the right lamp 70Ra is not provided on the right of the right end portion 221R of the body cover 22, and the whole of the left lamp 70La is not provided on the left of the left end portion of the body cover 22, so that the enlargement in size of the vehicle 1 in its width direction is prevented. Consequently, the enlargement in size of the vehicle 1 in its width direction is prevented while preventing the interference of the right lamp 70R and the left lamp 70L with the link mechanism 5.

The preferred embodiments and modifications that have been described heretofore are intended to facilitate the understanding of the present invention and is not intended to limit the present invention. The preferred embodiments of the present invention can be modified or improved without departing from the scope thereof and that their equivalents can be also included in the present invention.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

For example, in the preferred embodiments and the modified examples, although the front cover 221 preferably is separate from the front mudguards 223 and the leg shield 225, the present invention is not limited thereto. When referred to herein, the front cover is a cover that covers at least a portion of the link mechanism 5, and the front cover may be a cover that is integral with the aforesaid front mud guards 223 and leg shield 225.

Additionally, in the preferred embodiments and the modified examples, while positions where to dispose the turn signal lamps are described, a pair of left and right positioning lamps, a pair of left and right headlamps or decorative lamps may be disposed in similar positions.

Additionally, in the preferred embodiments and the modified examples, while the left turn signal lamp 70L and the right turn signal lamp 70R are preferably independent lamps, the present invention is not limited thereto. For example, a configuration may be used in which the housing of the left turn signal lamp 70L and the housing of the right turn signal lamp 70 are independent and the left and right turn signal lamps 70L, 70R are continuous or integral by the outer cover of the left turn signal lamp 70L and the outer cover of the right turn signal lamp 70R. Additionally, the left turn signal lamp 70L and the right turn signal lamp 70R may be integral.

While the left light source portion 73L and the right light source portion 73R are preferably provided behind the front end portion of the link mechanism 5 and ahead of the rear end portion of the link mechanism 5 in relation to the upper middle axis C, the present invention is not limited thereto. At least one of the left light source portion 73L and the right light source portion 73R may be provided behind the front end portion of the link mechanism 5 and ahead of the rear end portion of the link mechanism 5 in relation to the upper middle axis C.

While the left mounting bracket 75L and the right mounting bracket 75R are preferably provided ahead of the front end portion of the link mechanism 5 in the positions on the upper cross portion 51 located above the upper middle axis C and behind the rear end portion of the link mechanism 5 in the positions on the upper cross portion 51 located above the upper middle axis C in relation to the upper middle axis C, the present invention is not limited thereto. At least one of the left mounting bracket 75L and the right mounting bracket 75R may be provided ahead of the front end portion of the link mechanism 5 in a position on the upper cross portion 51 located above the upper middle axis C and behind the rear end portion of the link mechanism 5 in a position on the upper cross portion 51 located above the upper middle axis C in relation to the upper middle axis C.

An LED (Light Emitting Diode) element, a filament bulb, a discharge bulb, a laser light source or a surface emitting panel light source (for example, an EL element) may be used as the light source portions 73L, 73R.

The outer covers 72L, 72R may be transparent to transmit light or may include a lens element that refracts light.

The reflecting portions 74R, 74L may each include an extension that reflects sun light in addition to a reflector that reflects light emitted from the light source portions 73L, 73R to a target area.

The left wiring 76L and the right wiring 76R are not limited to the cords. For example, the left wiring 76L and the right wiring 76R may include a wiring harness, a printed wiring circuit board in which wiring is printed on a substrate, a flexible wiring circuit board in which wiring is provided on a flexible substrate, a bus bar including a metallic plate, a wiring member in which a bus bar is embedded in a resin, and the like. The left wiring 76L and the right wiring 76R are not limited to the linear members but may include plate-shaped or belt-shaped members.

The size of the acute angle of the preferred embodiments is an angle including 0° and smaller than 90°. By nature, the acute angle does not include 0°, but in the present invention and the preferred embodiments that have been described above, the acute angle should include 0°. In the preferred embodiments, the imaginary plane that intersects perpendicularly or substantially perpendicularly the upper axes and the lower axes of the cross members is a plane that extends rearward and upward. However, the present invention is not limited thereto, and hence, the imaginary plane that intersects perpendicularly or substantially perpendicularly to the upper axes and the lower axes of the cross members may be a plane that extends forward and upward.

When referred to in this specification, "parallel" also includes two straight lines that do not intersect each other as members while they are inclined within the range of ±40°. When referred to in relation to the "direction," and the "member" in the present invention, the term "along" also includes a case where what goes along is inclined within the range of ±40° relative to the direction or the member. When referred to in relation to the "direction" in the present invention, "extend" also includes a case where what extends is inclined within the range of ±40° relative to the direction.

The vehicle 1 according to various preferred embodiments of the present invention preferably is a vehicle including a body frame that leans and two front wheels. The number of rear wheels may be one or more. The vehicle may include a body cover that covers the body frame. The vehicle may not include the body cover which covers the body frame. The power unit includes the power source. The power source is not limited to the engine and hence may be an electric motor.

In the above preferred embodiments, the center of the rear wheel 4 in relation to the left-and-right direction of the body frame 21 preferably coincides with the center of the distance defined between the left front wheel 31 and the right front wheel 32 in relation to the left-and-right direction of the body frame 21. Although the configuration described above is preferable, the center of the rear wheel 4 in relation to the left-and-right direction of the body frame 21 may not coincide with the center of the distance defined between the left front wheel 31 and the right front wheel 32 in relation to the left-and-right direction of the body frame 21.

In the preferred embodiments described above, the right side portion 54, the left side portion 53, and the headstock 211 are provided in positions that are superposed one on another in the side view of the body frame 21. However, in the side view of the body frame 21, the headstock 211 may be provided in a different position from the positions where the right side portion 53 and the left side portion 54 are provided in relation to the front-and-rear direction. Additionally, angles at which the right side portion 54 and the left side portion 53 lean from the up-and-down direction of the body frame 21 may differ from an angle at which the headstock 211 leans.

The headstock that supports the link mechanism may include a single structural element or a plurality of structural elements. In the event of the headstock 211 includes a plurality of components, the components may be fastened together through welding or bonding or may be fastened together with a fastening member such as a bolt or a rivet.

In the preferred embodiments described above, while the headstock 211 is preferably a portion of the body frame 21 that supports the steering shaft 60 so as to turn, the present invention is not limited thereto. A member may be used which supports the steering shaft 60 so as to turn about a middle steering axis Y3 in place of the headstock. For example, a member may be used which includes a bearing which supports the steering shaft 60 so as to turn about the middle steering axis Y3.

In the preferred embodiments described above, the body frame includes the headstock, the connecting member (the upper front-and-rear or longitudinal frame portion), the down frame (the up-and-down or vertical frame portion) and the under frame (the lower front-and-rear or longitudinal frame portion), and they are connected together through welding. However, the body frame of the present invention is not limited to the preferred embodiments described above. The body frame should preferably include the headstock, the upper longitudinal frame portion, the vertical frame portion, and the lower longitudinal frame portion. For example, the body frame may be integral entirely or partially through casting or the like. Additionally, in the body frame, the upper longitudinal frame portion and the vertical frame portion may include one member or separate members.

In the preferred embodiments described above, the left shock absorber 33 and the right shock absorber 34 each preferably include the pair of telescopic mechanisms. However, depending upon the specification of the vehicle 1, the number of telescopic mechanisms that the left shock absorber 33 and the right shock absorber 34 include individually may be one.

In the preferred embodiments described above, the acute angle defined by the turning axis of the steering shaft and the up-and-down direction of the body frame preferably coincides with the acute angle defined by the direction in which the right shock absorber and the left shock absorber extend or contract and the up-and-down direction of the body frame. However, the present invention is not limited to the preferred embodiments. For example, the acute angle defined by the turning axis of the steering shaft and the up-and-down direction of the body frame may be smaller or greater than the acute angle defined by the direction in which the right shock absorber and the left shock absorber extend or contract and the up-and-down direction of the body frame.

In addition, in the preferred embodiments described above, the turning axis of the steering shaft and the direction in which the right shock absorber and the left shock absorber extend and contact preferably coincide with each other. However, the present invention is not limited to the preferred embodiments. In a side view of the vehicle being in the upright state, the turning axis of the steering shaft and the direction in which the right shock absorber and the left shock absorber extend or contact may be spaced apart from each other in the front-and-rear direction. Alternatively, they may intersect each other.

In the preferred embodiments described above, the right front wheel and the left front wheel are preferably supported so that their upper ends move farther upward in the up-and-down direction of the body frame than an upper end of the down frame of the body frame. However, the present invention is not limited to the preferred embodiments. In the present invention, the right front wheel and the left front wheel may be able to move upward as high as or to a height that is lower than the upper end of the down frame of the body frame in the up-and-down direction of the body frame.

The upper cross portion may include an upper front cross portion that includes a single portion, an upper rear cross portion that includes a single portion, and a connecting member that is provided between the upper and lower cross portions and that includes a plurality of portions. In the event of the headstock 211 includes the plurality of components, the components may be fastened together through welding or bonding or may be fastened together with a fastening member such as a bolt or a rivet.

The lower cross portion may include a lower front cross portion that includes a single portion, a lower rear cross portion that includes a single portion and a connecting member that is provided between the lower front and rear cross portions and that includes a plurality of portions. In the event of the headstock 211 includes the plurality of components, the components may be fastened together through welding or bonding or may be fastened together with a fastening member such as a bolt or a rivet.

The right side portion and the left side portion may each include a single portion or a plurality of portions. In the event of the headstock 211 includes the plurality of components, the components may be fastened together through welding or bonding or may be fastened together with a fastening member such as a bolt or a rivet. The right side portion and the left side portion may each include a portion that is disposed ahead of the upper cross portion or the lower cross portion in the front-and-rear direction of the body frame and a portion that is disposed behind the upper cross portion or the lower cross portion in the front-and-rear direction of the body frame. The upper cross portion or the lower cross portion may be disposed between the portions that are disposed ahead of the right side portion and the left side portion and the portions that are disposed behind the right side portion and the left side portion.

In the preferred embodiments of the present invention, the link mechanism may include further a cross portion in addition to the upper cross portion and the lower cross portion. The upper cross portion and the lower cross portion are so called only from their relative positional relationship in the up-and-down direction. The upper cross portion does not imply an uppermost cross portion in the link mechanism. The upper cross portion means a cross portion that is located above a cross portion that is located therebelow. The lower cross portion does not imply a lowermost cross portion in the link mechanism. The lower cross portion means a cross portion that is located below a cross portion that is located thereabove. Additionally, the cross portion may include two portions of a right cross portion and a left cross portion. In this manner, the upper cross portion and the lower cross portion may each include a plurality of cross portions as long as they still exhibit the link function. Further, other cross portions may be provided between the upper cross portion and the lower cross portion. The link mechanism should include the upper cross portion and the lower cross portion.

The present invention can be implemented with many different preferred embodiments. This disclosure should be understood to provide principle preferred embodiments of the present invention. Based on the understanding that there is no intention to limit the present invention to the preferred embodiments that are described and/or illustrated herein, the preferred embodiments are described and illustrated herein.

The illustrated preferred embodiments of the present invention are described herein. The present invention is not limited to the preferred embodiments described herein. The present invention also includes every preferred embodiment which includes equivalent elements, modifications, deletions, combinations (for example, a combination of characteristics from various preferred embodiments), improvements and/or alternations which those skilled in the art to which the present invention pertains can recognize based on the disclosure made herein. The limitative matters of claims should be construed broadly based on terms used in the claims and hence should not be limited by the preferred embodiments described in this specification or the prosecution of this patent application. Those preferred embodiments should be construed as non-exclusive. For example, in this disclosure, such terms as "preferable or preferably" and "may be or do" are non-exclusive terms and mean that "it is preferable, but the present invention is not limited thereto" and "it may be or do, but the present invention is not limited thereto," respectively.

The contents of the Japanese Patent Application No. 2013-138488 filed on Jul. 1, 2013 and the Japanese Patent Application No. 2013-207729 filed on Oct. 2, 2013 are incorporated by reference in their entirety and constitute part of the description of this patent application. In particular, the following configurations also constitute part of the description of the patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A vehicle comprising:
a body frame that leans to a right when the vehicle turns right and that leans to a left when the vehicle turns left;
a steerable right front wheel and left front wheel that are aligned in a left-and-right direction of the body frame;
a right shock absorbing device that supports the right front wheel at a lower portion thereof so as to absorb an upward displacement of the right front wheel in an up-and-down direction of the body frame;
a left shock absorbing device that supports the left front wheel at a lower portion thereof so as to absorb an upward displacement of the left front wheel in the up-and-down direction of the body frame;
a link mechanism including:
a right side portion that supports an upper portion of the right shock absorbing device so as to allow the upper portion to turn about a right steering axis that extends in the up-and-down direction of the body frame;
a left side portion that supports an upper portion of the left shock absorbing device so as to allow the upper portion to turn about a left steering axis that is parallel or substantially parallel to the right steering axis;

an upper cross portion that supports, at a right end portion thereof, an upper portion of the right side portion so as to allow the upper portion to turn about an upper right axis that extends in a front-and-rear direction of the body frame and supports, at a left end portion thereof, an upper portion of the left side portion so as to allow the upper portion to turn about an upper left axis that is parallel or substantially parallel to the upper right axis, and that is supported at a middle portion thereof on the body frame so as to turn about an upper middle axis that is parallel or substantially parallel to the upper right axis and the upper left axis; and
a lower cross portion that supports, at a right end portion thereof, a lower portion of the right side portion so as to allow the lower portion to turn about a lower right axis that is parallel or substantially parallel to the upper right axis and supports, at a left end portion thereof, a lower portion of the left side portion so as to allow the lower portion to turn about a lower left axis that is parallel or substantially parallel to the upper left axis, and that is supported at a middle portion thereof on the body frame so as to turn about a lower middle axis that is parallel to the upper middle axis;
a body cover that covers at least a portion of the link mechanism; and
a right lamp and a left lamp that are aligned in the left-and-right direction of the body frame, the right lamp including a right light source and the left lamp including a left light source; wherein
the right lamp includes a right link side portion that is located behind a front end portion of the link mechanism that is located above the upper middle axis in the up-and-down direction of the body frame and ahead of a rear end portion of the link mechanism that is located above the upper middle axis in the up-and-down direction of the body frame, in a side view of the vehicle in an upright state;
the right link side portion is located on the right of a locus along which the link mechanism extends when the upper cross portion turns relative to the body frame in relation to the left-and-right direction of the body frame, when looking at the vehicle in the upright state from the front of the upper middle axis;
at least a portion of the right link side portion is located on the left of a right end portion of the body cover in the left-and-right direction of the body frame, above the upper middle axis in the up-and-down direction of the body frame, and below an upper end portion of the link mechanism in relation to the up-and-down direction of the body frame that results when the upper cross portion turns clockwise to a maximum extent relative to the body frame, when looking at the vehicle in the upright state from the front of the upper middle axis;
the left lamp includes a left link side portion that is located behind the front end portion of the link mechanism that is located above the upper middle axis in the up-and-down direction of the body frame and ahead of the rear end portion of the link mechanism that is located above the upper middle axis in the up-and-down direction of the body frame in relation to the direction of the upper middle axis, in the side view of the vehicle in the upright state;
the left link side portion is located on the left of a locus along which the link mechanism extends when the upper cross portion turns relative to the body frame in the left-and-right direction of the body frame, when looking at the vehicle in the upright state from the front of the upper middle axis; and at least a portion of the left link side portion is located on the right of a left end portion of the body cover in the left-and-right direction of the body frame, above the upper middle axis in the up-and-down direction of the body frame, and below an upper end portion of the link mechanism in relation to the up-and-down direction of the body frame that results when the upper cross portion turns counterclockwise to a maximum extent relative to the body frame, when looking at the vehicle in the upright state from the front of the upper middle axis.

2. The vehicle according to claim 1, further comprising:

a middle lamp located between the right lamp and the left lamp in the left-and-right direction of the body frame in a front view of the vehicle in the upright state;

wherein at least a portion of the middle lamp is located below the right lamp and the left lamp in the up-and-down direction of the body frame and ahead of the link mechanism in relation to the direction of the upper middle axis.

3. The vehicle according to claim 1, wherein the body cover includes a right opening portion and a left opening portion;

a portion of the right link side portion is located inward of the right opening portion in the body cover while another portion thereof is located outward of the right opening portion in the body cover; and a portion of the left link side portion is located inward of the left opening portion in the body cover while another portion thereof is located outward of the left opening portion in the body cover.

4. The vehicle according to claim 3, wherein the right link side portion is located outward of the right opening portion in the body cover and includes at least a portion of a right outer cover that transmits light of the right light source; and the left link side portion is located outward of the left opening portion in the body cover and includes at least a portion of a left outer cover that transmits light of the left light source.

5. The vehicle according to claim 1, wherein the right lamp includes a right mounting portion where the right lamp is fixed to the body frame;

at least a portion of the right mounting portion is located ahead of the front end portion of the link mechanism that is located above the upper middle axis in the up-and-down direction of the body frame and behind the rear end portion of the link mechanism that is located above the upper middle axis in the up-and-down direction of the body frame in relation to the direction of the upper middle axis;

the left lamp includes a left mounting portion where the left lamp is fixed to the body frame; and at least a portion of the left mounting portion is located ahead of the front end portion of the link mechanism that is located above the upper middle axis in the up-do-down direction of the body frame or is located behind the rear end portion of the link mechanism that is located above the upper middle axis in the up-and-down direction of the body frame in relation to the direction of the upper middle axis.

6. The vehicle according to claim 1, wherein the body cover includes a right opening portion and a left opening portion;

the right link side portion includes a right housing that accommodates at least a portion of the right light source;

at least a portion of the right housing is located outward of the right opening portion;

the left link side portion includes a left housing that accommodates at least a portion of the left light source; and at least a portion of the left housing is located outward of the left opening portion.

7. The vehicle according to claim 6, wherein the right lamp includes a right mounting portion where the right lamp is fixed to the body frame, and the right link side portion includes at least a portion of the right mounting portion; and the left lamp includes a left mounting portion where the left lamp is fixed to the body frame, and the left link side portion includes at least a portion of the left mounting portion.

8. The vehicle according to claim 1, wherein the right lamp includes a right outer cover that transmits light of the right light source;

a front end portion of the right outer cover is located ahead of the front end portion of the link mechanism that is located above the upper middle axis in the up-and-down direction of the body frame in relation to the direction of the upper middle axis;

the left lamp includes a left outer cover that transmits light of the left light source; and a front end portion of the left outer cover is located ahead of the front end portion of the link mechanism that is located above the upper middle axis in the up-and-down direction of the body frame in relation to the direction of the upper middle axis.

9. The vehicle according to claim 1, wherein the right link side portion of the right lamp includes at least a portion of a right light source portion; and the left link side portion of the left lamp includes at least a portion of a left light source portion.

10. The vehicle according to claim 1, wherein the right lamp includes a right reflecting portion that reflects light;

the right link side portion includes at least a portion of the right reflecting portion;

the left lamp includes a left reflecting portion that reflects light; and the left link side portion includes at least a portion of the left reflecting portion.

11. The vehicle according to claim 1, wherein the right lamp includes a right wiring that is connected to the light source;

the right wiring is fixed to the body frame in a position that is located ahead of the front end portion of the link mechanism that is located above the upper middle axis in the up-and-down direction of the body frame or behind the rear end portion of the link mechanism that is located above the upper middle axis in the up-and-down direction of the body frame in relation to the direction of the upper middle axis;

the left lamp includes a left wiring that is connected to the left light source; and the left wiring is fixed to the body frame in a position that is located ahead of the front end portion of the link mechanism that is located above the upper middle axis in the up-and-down direction of the body frame or behind the rear end portion of the link mechanism that is located above the upper middle axis in the up-and-down direction of the body frame in relation to the direction of the upper middle axis.

12. The vehicle according to claim 1, wherein the right end portion of the right link side portion of the right lamp is located on the left of the right end portion of the body cover in the left-and-right direction of the body frame when looking at the vehicle in the upright state from the front of the upper middle axis; and
  a left end portion of the left link side portion of the left lamp is located on the right of the left end portion of the body cover in the left-and-right direction when looking at the vehicle in the upright state from the front of the upper middle axis.

* * * * *